(12) United States Patent
Sharma et al.

(10) Patent No.: US 12,425,929 B2
(45) Date of Patent: Sep. 23, 2025

(54) METHOD OF REQUESTING A HANDOVER OF A COMMUNICATIONS DEVICE

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB); Lars Nord, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 560 days.

(21) Appl. No.: 17/628,572

(22) PCT Filed: Jul. 20, 2020

(86) PCT No.: PCT/EP2020/070454
§ 371 (c)(1),
(2) Date: Jan. 20, 2022

(87) PCT Pub. No.: WO2021/018652
PCT Pub. Date: Feb. 4, 2021

(65) Prior Publication Data
US 2022/0264407 A1    Aug. 18, 2022

(30) Foreign Application Priority Data
Jul. 29, 2019    (EP) ..................................... 19188926

(51) Int. Cl.
*H04W 36/00*    (2009.01)
*H04W 36/12*    (2009.01)

(52) U.S. Cl.
CPC ... *H04W 36/0033* (2013.01); *H04W 36/0061* (2013.01); *H04W 36/125* (2018.08)

(58) Field of Classification Search
CPC ... H04W 48/18; H04W 36/14; H04W 36/125; H04W 36/0033; H04W 36/0016; H04W 36/0061
See application file for complete search history.

(56) References Cited

U.S. PATENT DOCUMENTS 8,958,797 B2 *  2/2015  Jokinen ............. H04W 36/0016
                                                          455/436
2020/0314701 A1 * 10/2020 Talebi Fard ...... H04W 36/0016
(Continued)

FOREIGN PATENT DOCUMENTS

WO    2018/073485 A1    4/2018

OTHER PUBLICATIONS

International Search Report and Written Opinion mailed on Nov. 30, 2020, received for PCT Application PCT/EP2020/070454, Filed on Jul. 20, 2020, 34 pages.

(Continued)

*Primary Examiner* — Allahyar Kasraian
(74) *Attorney, Agent, or Firm* — XSENSUS LLP

(57) ABSTRACT

A method of requesting a handover of a communications device in a source cell by a source infrastructure equipment in a wireless communications network, the wireless communications network comprising the source infrastructure equipment and a non public network (NPN) portion comprising a target infrastructure equipment providing a wireless access interface in a target cell, the method comprising: transmitting by the source infrastructure equipment to the target infrastructure equipment, via an interface connecting the source infrastructure equipment and the target infrastructure equipment, a handover request message requesting the handover of the communications device, the handover request comprising an indication of one or more identities associated with non-public cells which the communications device is permitted to access.

15 Claims, 7 Drawing Sheets

(56) References Cited

U.S. PATENT DOCUMENTS

| | | | | |
|---|---|---|---|---|
| 2020/0323017 | A1* | 10/2020 | Niemi | H04W 12/0431 |
| 2021/0112486 | A1* | 4/2021 | Ke | H04W 48/20 |
| 2021/0345226 | A1* | 11/2021 | Liao | H04W 48/18 |
| 2022/0201482 | A1* | 6/2022 | Ferdi | H04L 9/0891 |

OTHER PUBLICATIONS

Huawei, "(TP for NPN BL CR for TS 38.300): Connected mobility for NPN", 3GPP TSG-RAN3 Meeting #107-e, R3-200715, Feb. 24-Mar. 6, 2020, 3 pages.

Nokia et al., "(TP for NPN BL CR for 38.413) Mobility aspects of NPN", 3GPP TSG-RAN WG3#106, R3-197595, Nov. 18-22, 2019, 3 pages.

Nokia et al., "(TP for NPN BL CR for 38.300) Mobility aspects of NPN", 3GPP TSG-RAN WG3#106, R3-197777, Nov. 18-22, 2019, 5 pages.

ZTE, "Clarification on the CAG ID and Slicing", 3GPP TSG-SA WG2 Meeting #132, S2-1903617, Apr. 8-12, 2019, 12 pages.

3GPP, "System Architecture for the 5G System; Stage 2 (Release 16)", 3GPP TS 23.501, V16.0.2, Apr. 2019, 317 pages.

3GPP, "Procedures for the 5G System; Stage 2 (Release 16)", 3GPP TS 23.502, V16.0.2, Apr. 2019, 419 Pages.

3GPP, "NR; NR and NG-RAN Overall Description; Stage 2 (Release 15)", 3GPP TS 38.300, V15.5.0, Mar. 2019, 95 pages.

3GPP, "Service requirements for the 5G system; Stage 1 (Release 16)", 3GPP TS 22.261, V16.7.0, Mar. 2019, 71 pages.

3GPP, "Numbering, Addressing and Identification (Release 15)", 3GPP TS 23.003, V15.6.0, Dec. 2018, 130 pages.

3GPP, "Non-Access-Stratum (NAS) Functions Related to Mobile Station (MS) in Idle Mode (Release 16)", 3GPP TS 23.122, V16.1.0, Mar. 2019, 20 pages.

3GPP, "System Architecture for the 5G System; Stage 2 (Release 16)", 3GPP TS 23.501, V16.0.0, Mar. 2019, 318 pages.

3GPP, "Procedures for the 5G System; Stage 2 (Release 16)", 3GPP TS 23.502, V15.4.1 , Jan. 2019, 23 Pages.

3GPP, 3GPP TS 24.501, V16.0.2, Mar. 2019, 480 pages.

3GPP, "Security Architecture and Procedures for 5G system (Release 15)", 3GPP TS 33.501, V15.2.0, Sep. 2018, 176 pages.

3GPP, "Security Architecture and Procedures for 5G System (Release 15)", 3GPP TS 33.501, V15.4.0, Mar. 2019, 187 pages.

Nokia et al., "Revised SID: Study on NR Industrial Internet of Things (Iot)", 3GPP TSG RAN meeting #81, RP-182090, Sep. 10-13, 2018, 5 pages.

3GPP, "NR; NR and NG-RAN Overall Description; Stage 2 (Release 15)", 3GPP TS 38.300, V15.4.0, Dec. 2018, 97 pages.

Holma et al., "LTE for UMTS OFDMA and SC-FDMA Based Radio Access", John Wiley & Sons, 2009, pp. 25-27.

3GPP, "Radio Resource Control (RRC) Protocol Specification (Release 15)", 3GPP TS 38.331, V15.3.0, Sep. 2018, 445 pages.

3GPP, "User Equipment (UE) Procedures in Idle Mode and RRC Inactive State (Release 15)", 3GPP TS 38.304, V15.2.0, Dec. 2018, 28 pages.

Arkko et al., "Extensible Authentication Protocol Method for 3rd Generation Authentication and Key Agreement", Network Working Group, Jan. 2006, 79 pages.

* cited by examiner

METHOD OF REQUESTING A HANDOVER OF A COMMUNICATIONS DEVICE

CROSS-REFERENCE TO RELATED APPLICATIONS

The present application is based on PCT/EP2020/070454 filed on Jul. 20, 2020, and claims priority to EP 19188926.0 filed on Jul. 29, 2019, the entire contents of each are incorporated herein by reference.

BACKGROUND

Field

The present disclosure relates to communications devices, infrastructure equipment and methods of accessing a restricted access cell by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new Radio Access Technology (RAT) systems [1], as well as future iterations/releases of existing systems, to efficiently support connectivity for a wide range of devices associated with different applications and different characteristic data traffic profiles.

One aspect which may be considered for wireless communications networks and communications devices for 5G/NR technology is an arrangement in which the wireless communications network is divided into a public network part and a non-public network part. Access of the communications devices to the non-public network part may be restricted to certain types of communications devices or to a controlled group of communications devices. A technical challenge therefore arises in supporting mobility of communications devices between the different network parts.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
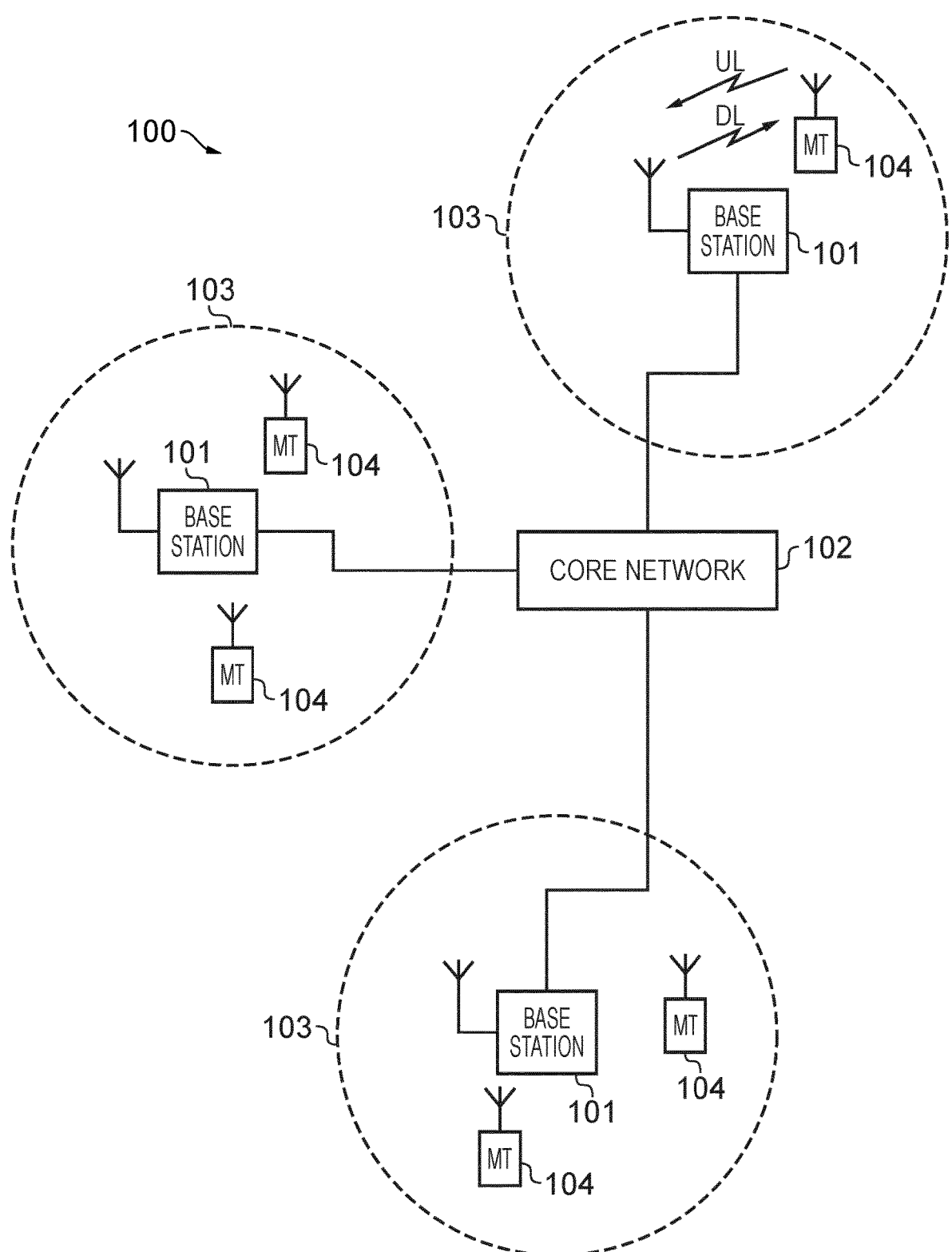
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
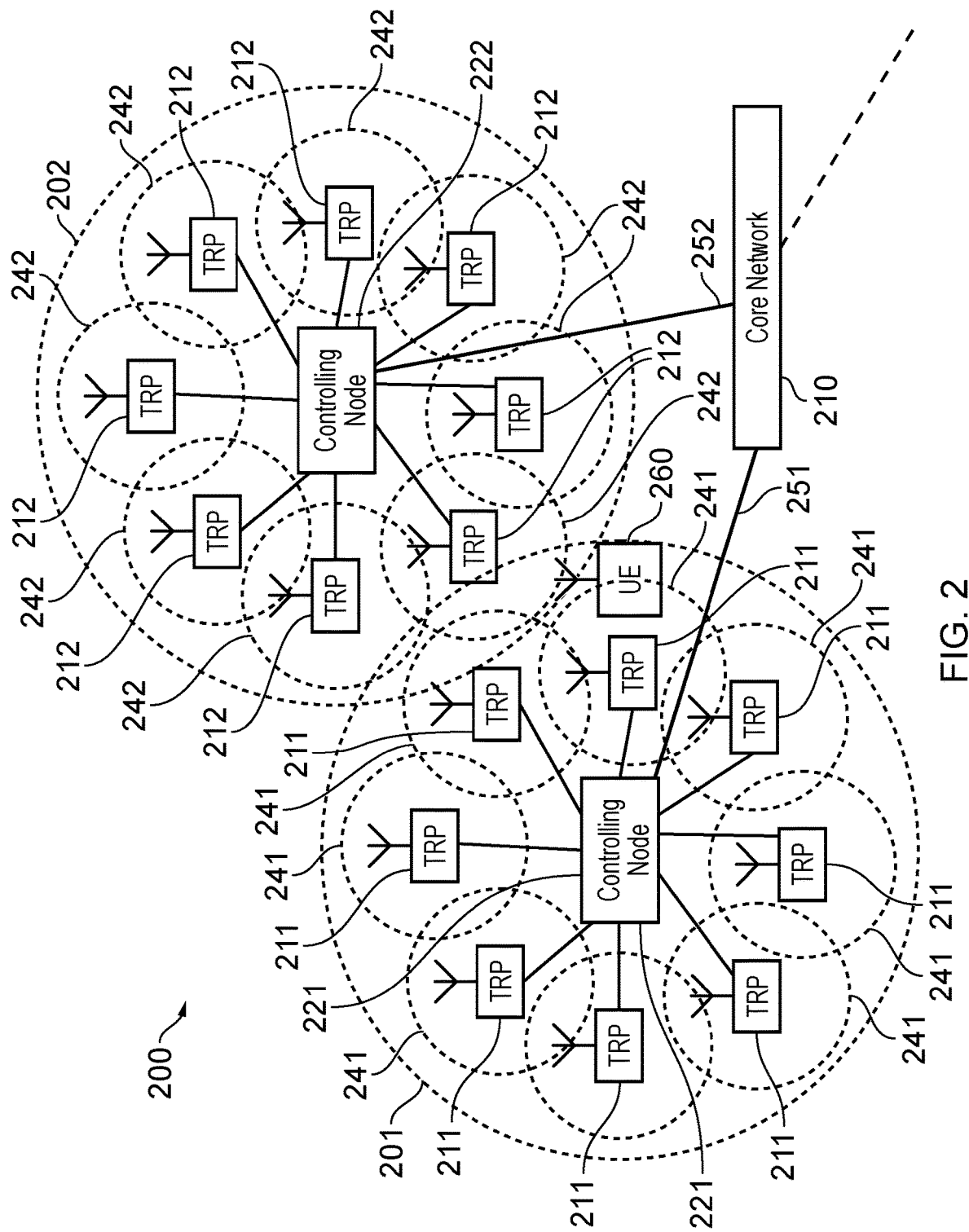
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new Radio Access Technology (RAT) wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
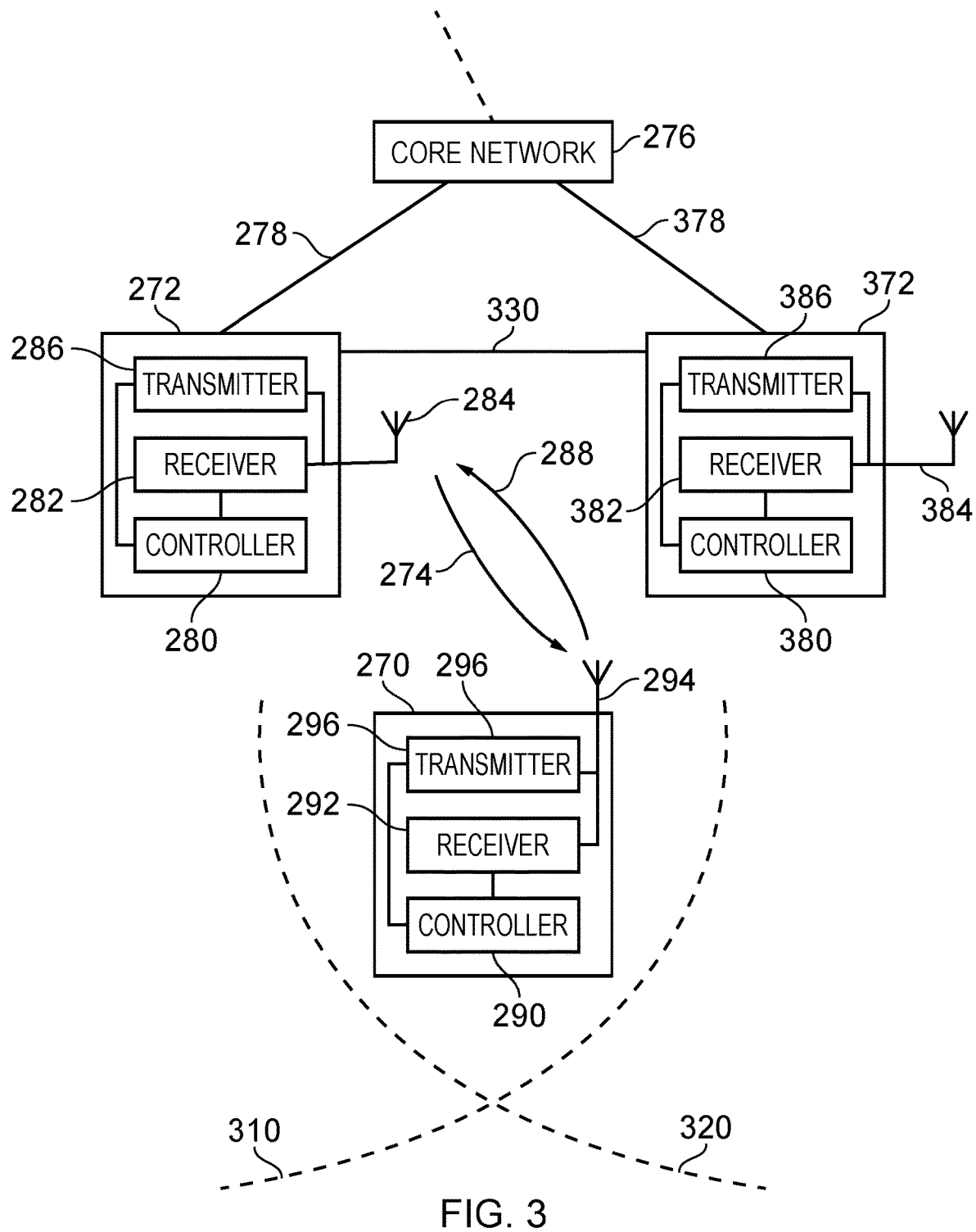
FIG. 3 is a schematic block diagram of example infrastructure equipment and communications device which may be configured in accordance with certain embodiments.

FIG. 3 illustrates schematically a UE/communications device 270 and example first and second network infrastructure equipment 272, 372. The communications device 270 may be thought of as an example of the communications device 104 of FIG. 1 or of the UE 260 of FIG. 2. Each of the first and second infrastructure equipment 272, 372, may be thought of as a gNB 101 or a combination of a controlling node 221 and TRP 211. Controllers 280, 380 of the infrastructure equipment 272, 372 are connected to a core network part 276 via respective interfaces 278, 378.

The first infrastructure equipment 272 includes a receiver 282 connected to an antenna 284 and a transmitter 286 connected to the antenna 284. Similarly, the second infrastructure equipment 372 includes a receiver 382 connected to an antenna 384 and a transmitter 386 connected to the antenna 384.

Correspondingly, the UE 270 includes a controller 290 connected to a receiver 292 which receives signals from an antenna 294 and a transmitter 296 also connected to the antenna 294.

The controllers 280, 380 are configured to control the first and second infrastructure equipment 272, 372 respectively and may comprise processor circuitry which may in turn comprise various sub-units/sub-circuits for providing functionality as explained further herein. These sub-units may be implemented as discrete hardware elements or as appropriately configured functions of the processor circuitry. Thus the controllers 280, 380 may comprise circuitry which is suitably configured/programmed to provide the desired functionality using conventional programming/configuration techniques for equipment in wireless telecommunications systems. The transmitters 286, 386 and the receivers 282, 382 may comprise signal processing and radio frequency filters, amplifiers and circuitry in accordance with conventional arrangements. The transmitters 286, 386, the receivers 282, 382 and the controllers 280, 380 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272, 372 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 380, 290 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

The first and second infrastructure equipment 272, 372 are connected directly to each other via an inter-infrastructure equipment interface 330, which, for example, may be operated broadly in accordance with conventional specifications for an X2 or Xn interface as specified by 3GPP.

The first infrastructure equipment 272 controls a first cell 310 in which the communications device 270 receives downlink data from the first infrastructure equipment 272 via resources of a wireless access interface as illustrated generally by an arrow 274, and transmits uplink data to the first infrastructure equipment 272 via resources of the wireless access interface as illustrated generally by an arrow 288.

The second infrastructure equipment 372 controls a second cell 320, which forms a part of a non public network, as will now be described.

Non Public Networks

Conventionally, a goal of operators of wireless communications networks has been to provide greatest geographical coverage and/or maximum performance for all its customers, while minimising expenditure on infrastructure equipment. Accordingly, it is generally preferable that each communications device using a wireless communications network obtains service in the most appropriate cell of those available. Restrictions by which a communications device is barred from selecting a particular cell were rarely used, other than for testing and/or other temporary operational reasons.

However, there has emerged a requirement to restrict certain cells to certain subscribers/communications devices. For example, an organisation may enter into an agreement with an operator of an existing wireless communications network, whereby the wireless communications network operator extends an existing network by deploying infrastructure equipment to generate new cells covering the organisation's premises. These cells may be restricted to communications devices associated with employees and/or equipment belonging to that organisation. These cells may be referred to as a 'non public network' (NPN), and access restrictions may apply to all communications devices, such that all communications device are permitted to access NPN cells only if they have the required permission(s).

As a result of such an arrangement, the organisation may ensure that communications devices under its control are ensured of having good coverage and/or good performance in a particular area. In particular, the NPN cells may cover indoor and/or underground spaces where conventional coverage is weak or non-existent.

Non Public Networks (NPN) are therefore networks which are deployed outside of a traditional mobile operator network. There are mainly two deployment options:
   NPN deployed as a Standalone Non Public Network (SNPN)
   NPN deployed as part of an operator's network as a Non-Standalone Non Public Network (NSNPN)

Where the cells form part of an existing public network, they may be referred to as a non-standalone NPN (NSNPN). Alternatively, infrastructure equipment and corresponding cells may form a 'standalone' network, separate from an existing network. Such a standalone network may be referred to as a 'standalone non public network (SNPN). SNPNs may be assigned an identifier similar to a PLMN ID. Accordingly, a communications device may be configured to operate in a mode where it selects only an SNPN, in addition to performing conventional PLMN selection (see [3], section 5.30.2).

For NSNPN, it has been proposed that cells which are part of an NPN are associated with one or more closed access group (CAG) IDs, and that communications devices are provisioned or configured with a list of zero or more CAG IDs depending on the NPN(s) which they are allowed to access. The system information (for example, SIB1) of an NPN cell may include an indication of the cell's associated CAG ID(s). A communications device can evaluate whether or not it is permitted to access the cell by means of an access check based on parameters associated with the cell, and with parameters for which the communications device 270 has permission. For example if the cell's system information indicates that the cell is an NPN cell, but does not indicate any CAG ID which is in a list of allowed CAG IDs of the communications device, then the communications device cannot access the cell.

Communications devices which are permitted access to NPN cells (i.e. are configured with one or more allowed CAG IDs) may or may not be permitted to access cells which are not NPN cells. If a communications device is configured with permission to access only cells associated with one or more specific CAG IDs, then it will consider any cell which is not an NPN cell as not valid as a serving cell.

When a NPN is hosted by a public network (NSNPN), the NPN could be implemented by realizing a dedicated network slice or APN (Access Point Name) for the NPN. A network slice may comprise a logical portion of the wireless communications network that can operate to a certain extent independently of other network slices, while sharing at least some physical equipment and/or communications links. For example, a first network slice may be associated with a first service provider, and a second network slice may be associated with a second service provider. Each service provider may be operate, for example, authentication and billing functions independently of each other; nevertheless, both network slices may use a common radio access network and/or common core network equipment. A network slice may be as defined in [3].

NSNPN deployment may require that an NPN identifier (ID) and a Closed Access Group (CAG) identifier (ID) are broadcast in a cell. For the example of an SNPN, a cell may broadcast a Public Land Mobile Network (PLMN) identifier (ID) and an NPN ID. The PLMN ID and NPN ID may not be unique in the network.

An NPN subscription may permit a UE to register and obtain service via the PN network as well.

LTE & CSG Cells

In 4G/LTE, closed subscriber group (CSG) functionality has been specified, whereby a communications device can be associated with one or more allowed CSG IDs. Access to a cell may be restricted to those communications devices associated with (i.e. having in an allowed list) a CSG ID associated with the cell.

In 4G/LTE, a wireless communications network may comprise CSG cells (that is, cells not accessible to communications devices not having any allowed CSG IDs) and non-CSG cells (cells having no restriction). A sub-class of CSG cells is known as hybrid cells—these cells may be accessed by certain communications devices according to the rules for non-CSG cells, and by certain other communications devices according to the rules for CSG cells. As such, access restrictions do not apply to communications devices which access the cell according to the rules for non-CSG cells.

Handovers between cells allow a communications device to remain in a connected mode (such as an RRC connected mode) while changing a serving cell from a source cell to a target cell. The communications device can accordingly continue to receive and transmit data with little or no interruption as a result of the cell change. A handover is generally controlled by the network, in the sense that the network selects the target cell (although this may be based on indications received from the communications device) and determines when a handover should occur.

Handover to a target CSG cell where access restrictions apply to all communications devices (i.e. where the cell is not a hybrid cell) is conventionally required to be via the core network part of the communications network, where a check that the communications device is permitted to access the target CSG cell occurs. As a result, communications resources are not made available in the target cell unless the communications device is confirmed to be permitted access.

However, handovers in which the core network part is involved can introduce delays in the handover procedure.

A number of issues arise with the deployment of NPN cells, particularly when deployed in proximity to PN cells. There is thus a need to provide solutions for mobility between NPN and PN cells.

Embodiments can provide a method of requesting a handover of a communications device in a source cell by a source infrastructure equipment in a wireless communications network, the wireless communications network comprising the source infrastructure equipment and a non public network (NPN) portion comprising a target infrastructure equipment providing a wireless access interface in a target cell, the method comprising: transmitting by the source infrastructure equipment to the target infrastructure equipment, via an interface connecting the source infrastructure equipment and the target infrastructure equipment, a handover request message requesting the handover of the communications device, the handover request comprising an indication of one or more identities associated with non-public cells which the communications device is permitted to access.

According to example embodiments, handover preparation signalling occurs by means of an interface connecting a first infrastructure equipment controlling a source (current)

cell and a second infrastructure equipment controlling the target cell. In some embodiments, a preliminary access control check is carried out by the second infrastructure based on indications provided by the first infrastructure equipment. In some embodiments, an access control check may be carried out by the communications device in the target cell. In some embodiments, an access control check may be carried out by the core network part after the communications device has established a connection in the target cell.

Accordingly, latency associated with a handover procedure may be reduced.

Figure 4:
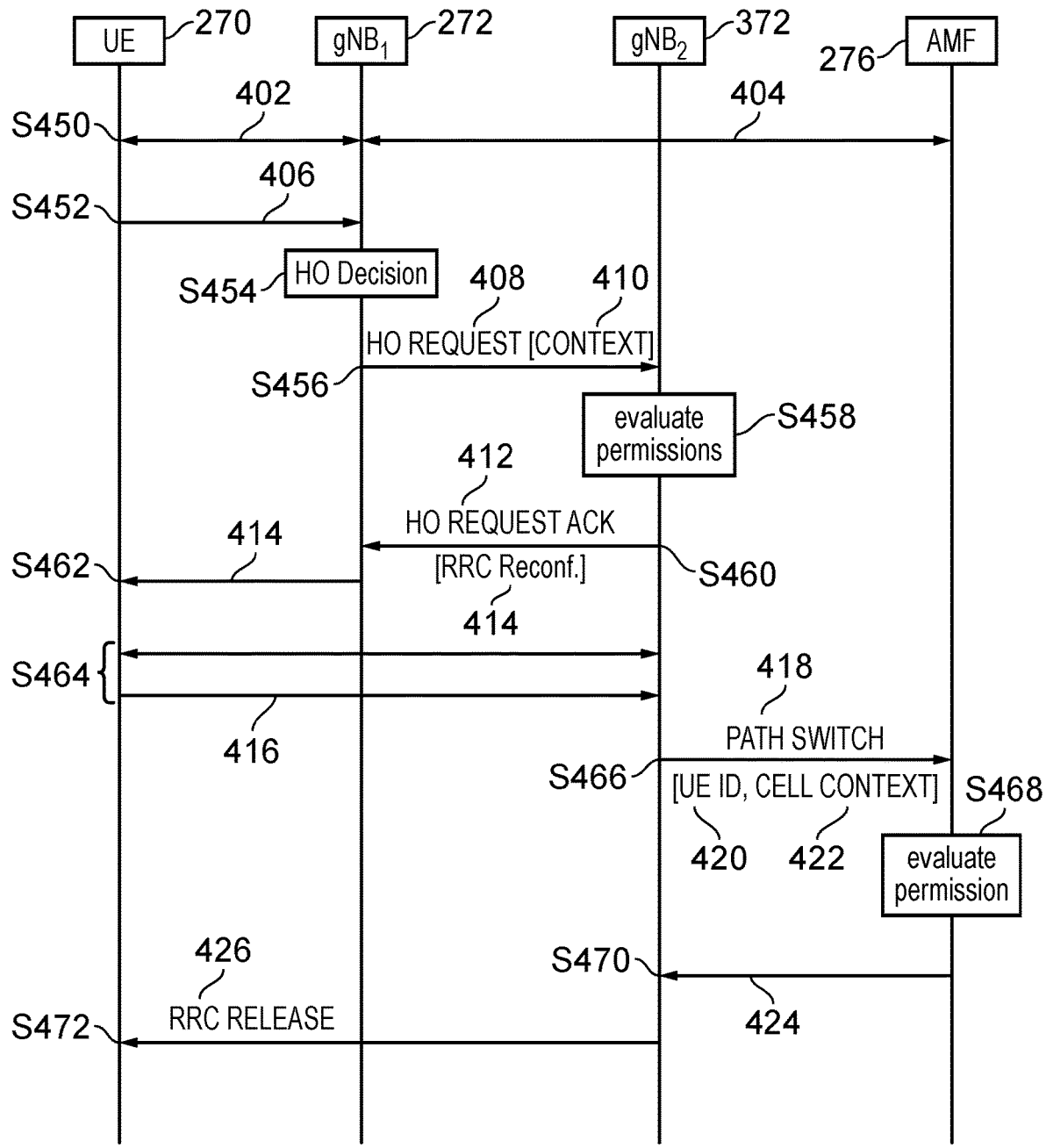
FIG. 4 shows a message sequence chart for a handover to a target cell in which access restrictions apply to all communications devices, in accordance with embodiments of the present technique.

FIG. 4 shows a message sequence chart for a handover to a target cell in which access restrictions apply to all communications devices, in accordance with embodiments of the present technique.

Initially at step S450, in the example of FIG. 4, the communications device 270 is in an RRC connected mode having an active RRC connection 402 with the first infrastructure equipment 272 in the first cell 310. The first infrastructure equipment 272 has a connection 404 with the core network part 276, which may comprise an access and mobility management function (AMF) providing an end-point for a non-access stratum control plane. User plane data may be transmitted to or from the communications device 270 via the first infrastructure equipment 272 and a user plane function (UPF) of the core network part 276 (not shown).

The communications device 270 may be configured to transmit measurement reports 460, comprising indications of results of measurements of downlink transmissions from the first infrastructure equipment 272 and from other infrastructure equipment, such as the second infrastructure equipment 372. Accordingly, at step S452, the communications device 270 transmits a measurement report 406 to the first infrastructure equipment 272.

At step S454, the first infrastructure equipment 272 determines that the communications device 270 should be the subject of a handover from the first cell 310 to the second cell 320. The determination may be made in a conventional manner, for example based on the measurement report 406, measurements made by the first infrastructure equipment 272 of uplink transmissions by the communications device 270, and load/capacity considerations related to the first infrastructure equipment 272, and the like.

At step S456, the first infrastructure equipment 272 transmits a handover request message 408 to the second infrastructure equipment 372 via the inter-infrastructure equipment interface 330. The handover request message 408 may include an identity of the communications device 270, an indication of the identity of the second cell 320, and context parameters 410 for permitting the second infrastructure equipment 372 to determine whether the communications device 270 is permitted to access the second cell 320.

The context parameters 410 may include one or more of the following:
- an indication of an identity of a network slice, such as a Network Slice Selection Assistance Information (NS-SAI);
- an indication of an identity of a group, such as a controlled access group (CAG), having common access permissions with respect to a predetermined plurality of NPN cells;
- an indication of an identity of a wireless communications network, such as a public land mobile network (PLMN) identity; and
- an identity of a non-public network, such as a non-public network identity (NPN ID).

In some embodiments, the context parameters 410 may be identities associated with the first cell 310—for example, if the first cell 310 is not a NPN cell, the context parameters 410 may comprise an NSSAI and/or PLMN ID associated with the first cell. If the first cell 310 is an NPN cell, the context parameters 410 may comprise one or more of an NSSAI, one or more CAG IDs, PLMN ID and NPN ID associated with the first cell 310. Because the communications device 270 is already operating in the first cell 310, parameters associated with the first cell 310 correspond to cells which (in general) the communications device 270 is permitted to access.

In some embodiments, the context parameters 410 may alternatively or additionally comprise identities associated with the communications device 270. For example, the context parameters 410 may be based on a UE context stored at the first infrastructure equipment 272 which comprises identifiers of slices, NPN networks, CAGs and/or PLMN IDs associated with cells which the communications device 270 is permitted to access.

The UE context may be obtained by the first infrastructure equipment 272 either from the communications device 270 or from the core network part 276, for example as part of a registration procedure.

In any case, the context parameters 410 may comprise one or more slices, groups, networks and/or NPNs which the communications device 270 is permitted to access.

At step S458, the second infrastructure equipment 372 evaluates the handover request 408 and the context parameters 410. Based on predetermined parameters associated with the second cell 320, the second infrastructure equipment 372 determines whether the communications device 270 is permitted to access the second cell 320.

For example, if the context parameters 410 comprises a CAG ID which is equal to a CAG ID associated with the second cell 320, the second infrastructure equipment 372 may determine that the communications device 270 is permitted to access the second cell 320, at least in so far as there is any restriction based on CAG ID.

It will be appreciated that in some embodiments, it may not be possible based on the context parameters 410 to definitively determine whether the communications device 270 is permitted to access the second cell 320. For example, where the context parameters 410 correspond to the first cell 310, they may comprise a subset of identifiers of cells/slices/networks to which the communications device 270 is permitted access.

Accordingly, the second infrastructure equipment 372 may make an 'optimistic' determination as to whether the handover procedure should proceed. That is, the second infrastructure equipment 372 may determine either that the communications device 272 is not permitted access, or that there is insufficient information to determine whether the communications device is permitted access. In the latter case, the infrastructure equipment may allow the handover to proceed.

Alternatively, the second infrastructure equipment 372 may make a 'pessimistic' determination as to whether the handover procedure should continue. That is, the second infrastructure equipment 372 may determine either that the handover can proceed only if it can determine definitively that the communications device 272 is permitted access to the second cell 320.

At step S460, the second infrastructure equipment 372 transmits a handover request acknowledgement 412 to the first infrastructure equipment 272 in response to the handover request 408. The handover request acknowledgement 412 may comprise an indication of the outcome of the determination as to whether the handover can proceed. The handover request acknowledgement 412 may further comprise an indication of the basis for the determination. For example, the handover request acknowledgement 412 may comprise an indication that:

- the communications device 270 is not restricted from accessing the second cell 320 based on the CAG ID(s) indicated in the context 410;
- the indicated NSSAI in the context 410 does not match any NSSAI associated with the second cell 320; and
- it cannot be determined whether the communications device 270 will be permitted access, because the indicated NSSAI in the context 410 related only to the first cell 310, and the communications device may nevertheless be permitted access based on its own access rights to other slices.

If the second infrastructure equipment 372 determines that the handover may proceed, the handover request acknowledgement may comprise an indication of communications resources and parameters for the communications device 270 to establish a connection in the second cell 320. These may be included within an RRC Reconfiguration message 414 to be forwarded to the communications device 270.

In the example of FIG. 4, the second infrastructure equipment 372 determines that the handover may proceed, based on the outcome of the determination based on the context parameters 410.

At step S462, the first infrastructure equipment 272 transmits a message 414 to the communications device 270 to instruct it to perform a handover to the second cell 320. In some embodiments, the message 414 comprises an RRC Reconfiguration message, and may be the RRC Reconfiguration message 414 received from the second infrastructure equipment 372.

At step S464, the communications device 270 establishes an RRC connection in the second cell 320 in accordance with the message 414.

The RRC connection establishment at step S464 may be broadly in accordance with conventional handover techniques.

In some embodiments, as part of the handover procedure, the communications device 270 performs its own access check in respect of the second cell 320. The access check may be based on system information received in the second cell 320 and/or the RRC Reconfiguration message 414. For example, the communications device 270 may determine that it is in fact not permitted to access the second cell 320 because the second cell 320 is associated with a CAG ID for which the communications device 270 has no corresponding access permission.

In such embodiments, the communications device 270 may transmit a cell permission indication 416 to the second infrastructure equipment 372, comprising an indication of the outcome of the access check. The cell permission indication 416 may comprise an indication in an RRC Reconfiguration complete message. The RRC Reconfiguration complete message may be transmitted as part of the handover procedure carried out in the second cell 320.

In some embodiments, the cell permission indication 416 is transmitted only where the communications device 270 determines that it is not permitted to access the second cell 320.

At step S466, the second infrastructure equipment 372 transmits a path switch request 418 to the core network part 276 to indicate that the communications device 270 is now being served by the second infrastructure equipment 372 and to request that subsequent downlink data for the communications device 270 be transmitted to the second infrastructure equipment 372.

The path switch request 418 may comprise an indication of an identity 420 of the communications device 270 and a cell context 422 associated with the second cell 320. The cell context 422 may comprise one or more of a network slice identity, a CAG ID, a PLMN ID and an NPN ID associated with the second cell 320, to permit the core network entity to perform an access check in respect of the communications device 270 and the second cell 320.

At step S468 the core network part 276 may determine whether the communications device 270 is permitted to access the second cell 320. It should be pointed out that in some embodiments, the definitive record of access permissions for the communications device 270 is maintained only in the core network part 276 and as such, it may be that the communications device 270 (e.g. at step S464) and/or the second infrastructure equipment (e.g. at step S458) have incorrectly determined that the communications device 270 is permitted to access the second cell 320.

At step S470, the core network part 276 transmits a path switch response 424 comprising an indication of the outcome of its determination to the second infrastructure equipment 372. For example, if the core network part 276 determines that the communications device 270 is permitted to access the second cell 320, the path switch response 424 may be a path switch response message, and the core network part 276 subsequently forwards downlink data for the communications device 270 to the second infrastructure equipment 270.

Accordingly, embodiments of the present technique may provide a faster handover procedure in which preparation phase signalling (i.e. signalling which precedes the establishment of a connection in the second cell 320) does not involve the core network part 276.

If (as in the example of FIG. 4) the core network part 276 determines that the communications device 270 is not permitted to access the second cell 320, then the path switch response 424 may be a path switch failure message.

The path switch response 424 may comprise an indication of parameters associated with cells which the communications device 270 is permitted to access.

In response to receiving the path switch response 424 indicating that the communications device 270 is not permitted to access the second cell 320, then in some embodiments, at step S472, the second infrastructure equipment 372 transmits an enhanced connection release message 426 to the communications device 270. The enhanced connection release message 426 (which may be, for example, a modified RRC Release message) indicates that the communications device 270 is to select a different cell. The enhanced connection release message 426 may further indicate that the connection established at step S464 is terminated.

In some embodiments, the enhanced connection release message 426 comprises a cause indication, the cause indication indicating that the communications device 270 is not permitted to access the present cell (i.e. the second cell 320). The enhanced connection release message 426 may comprise an indication of parameters associated with cells which the communications device 270 is permitted to access. For example, the parameters may comprise one or more of a slice identifier, a CAG ID, an NPN ID and a PLMN ID (and may include multiple instances of one or more of these). These parameters may correspond to those indicated in the path switch response 424.

Accordingly, the communications device 270 may be provided with an up-to-date set of PN/NPN-related permissions to permit it to select a cell which it is permitted to access.

In the description above, the enhanced connection release message 426 is used in the context of an invalid handover procedure. However, the scope of the present disclosure is not so limited. For example, the enhanced connection release message 426 may be transmitted by the second infrastructure equipment 372 in response to a determination that, based on the access permissions of the communications device 270, the communications device 270 is not permitted to access the second cell 320. This determination may be, for example, in response to receiving an indication by a core network entity that the access permissions of the communications device 270 have changed (e.g. have been modified or have expired).

Accordingly, embodiments of the present technique may provide a method for updating a communications device with parameters associated with cells (and in particular NPN cells) which it is permitted to access. In particular, embodiments of the present technique also provide for an improved connection release procedure, by which a communications device can determine that a connection in a cell is to be released because the communications device is not permitted to access the cell.

Interworking Function

Although a cell may form a part of an NPN, it may be possible to access public network (PN) portions of a core network via an NPN cell and/or vice versa.

In accordance with embodiments of the present technique, a PN user plane function (UPF) 506 is connected via an interworking function (IWF) 508 (which may provide similar functionality to a conventional non-3GPP interworking function, N3IWF) to the non-public network portion of the radio access network (specifically, including the second infrastructure equipment 372). The IWF 508 may also permit communications between the NPN radio access network and the PN AMF 504.

Figure 5:
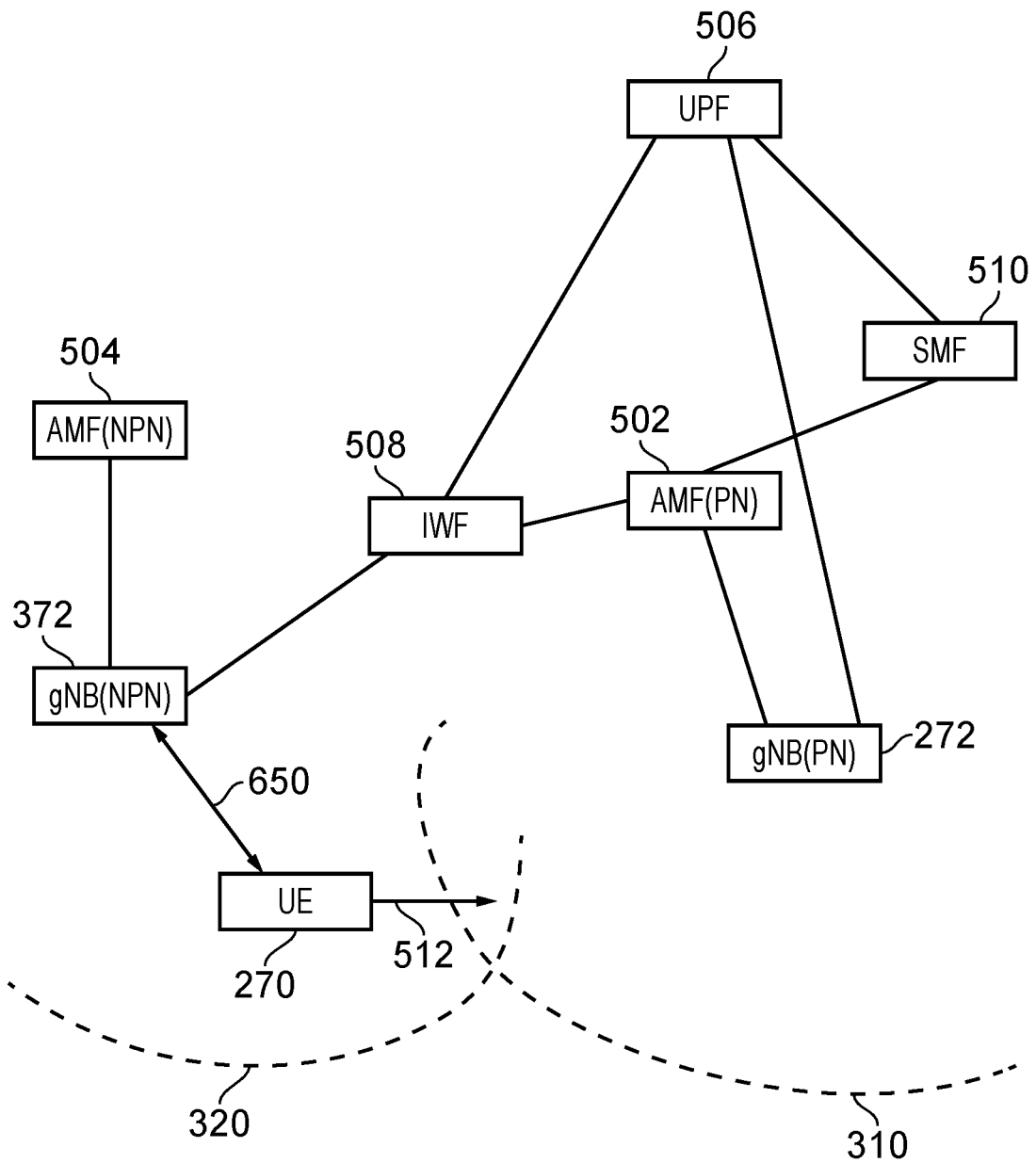
FIG. 5 shows an example logical topology illustrating aspects of radio access networks and a core network of a wireless communications network in accordance with embodiments of the present technique.

FIG. 5 shows an example logical topology illustrating aspects of radio access networks and a core network of a wireless communications network in accordance with embodiments of the present technique.

As in FIG. 3, the first infrastructure equipment 272 forms the first cell 310 as part of a public network (PN) radio access network (RAN). Similarly, the second infrastructure equipment 372 forms the second cell 320 as part of a non-public network (NPN) part of the network.

Each of the first and second infrastructure equipment 272, 372 are connected to a respective first and second access and mobility management function (AMF) 502, 504 providing core network control plane functions for public and non-public parts of the network, respectively. A session management function (SMF) 510 associated with the public network AMF 502 is also shown for providing session management functionality.

The PN UPF 506 provides core network user plane functionality, including providing connectivity to packet data networks (such as the internet) external to the wireless communications network, which are not shown in FIG. 5 for conciseness.

The PN UPF 506 is connected to the public network portion of the radio access network (specifically, including the first infrastructure equipment 272).

The session management function 510 may support multi-access protocol data unit (MA PDU) service, in which a PDU session may be associated with different access networks so that data associated with the PDU session may be transmitted via either or both of the different access networks.

In some embodiments, a handover of a communications device from the second cell 320 in an NPN RAN to the first cell 310 in a PN RAN may comprise the establishment of a MA PDU session whereby user plane data may be transmitted substantially simultaneously using both the PN RAN and the NPN RAN.

For the purposes of illustrating an example handover process, which will be described in detail below with respect to FIG. 6, FIG. 5 also shows the communications device 270 having an ongoing RRC connection 650 with the second infrastructure equipment 372, and moving into coverage of the first cell 310 as indicated by the arrow 512.

Figure 6:
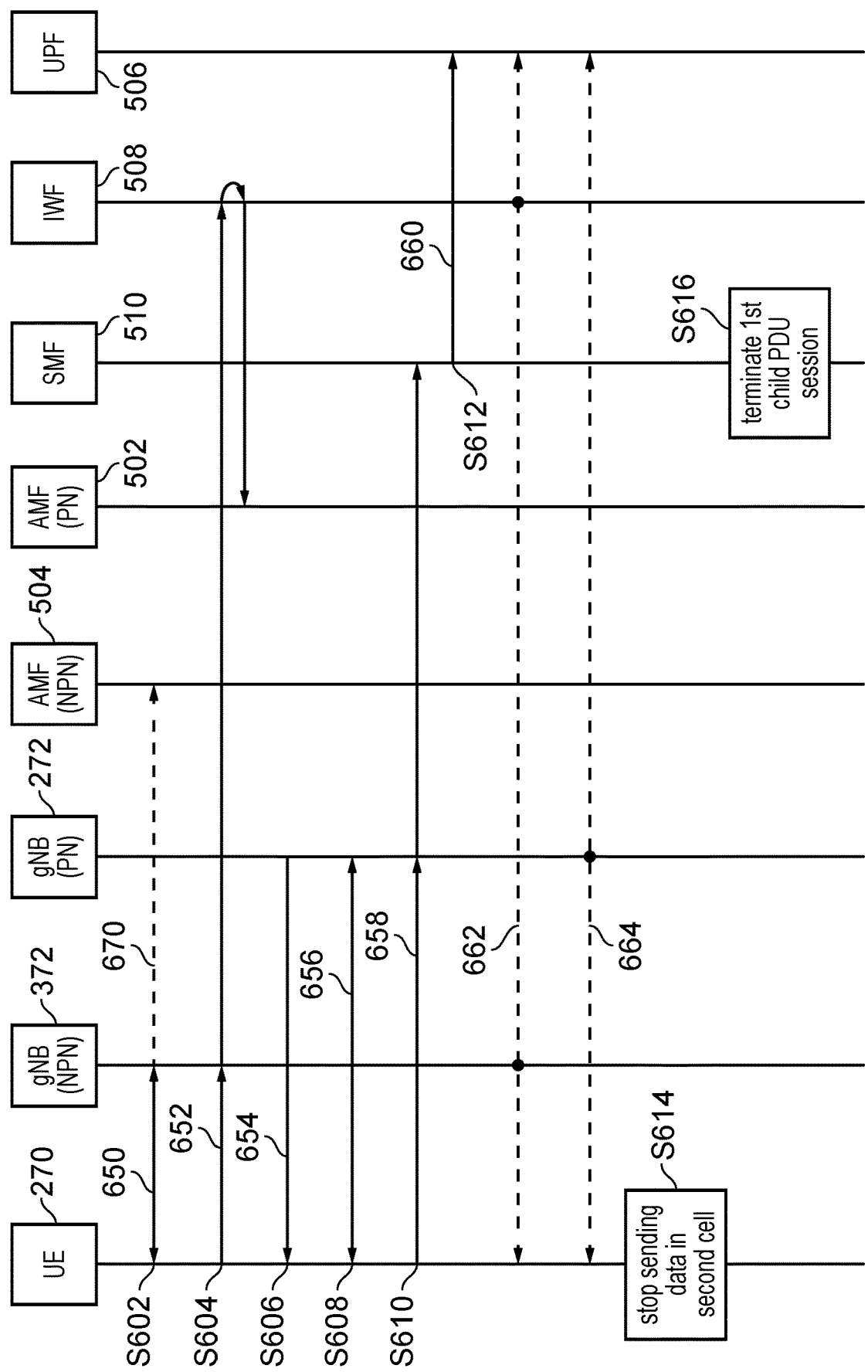
FIG. 6 illustrates a message sequence chart for a handover process for a communications device from a cell in a non-public network (NPN) portion of the network to a cell in a public network (PN) portion of the network in accordance with embodiments of the present technique.

FIG. 6 illustrates a message sequence chart for a handover process for the communications device 270 from the second cell 320 in an NPN portion of the network to the first cell 310 in a PN portion of the network in accordance with embodiments of the present technique.

The process starts at step S602, in which the communications device 270 is connected to the second infrastructure equipment 372 in the NPN and has an ongoing first RRC connection 650 with the second infrastructure equipment 372, as shown in FIG. 5. The communications device 270 is registered for NPN services with the second AMF 504, as indicated by the dotted line 670. As a result of registering with the second AMF 504, the communications device 270 obtains a temporary identity allocated by the second AMF 504, and may establish a PDU session for the transmission and/or reception of data associated with NPN services.

User plane data associated with the PDU session may be transmitted via second infrastructure equipment 372 and the UPF 506.

At step S604, the communications device 270 registers for PN services with the first AMF 502 by transmitting a child PDU registration request 652 in the second cell 320 to the second infrastructure equipment 372. The registration request may comprise the temporary identity and a request to establish a 'child PDU' session. This child PDU session may be associated with (e.g. based on) the PDU session if one was established at step S602.

The second infrastructure equipment 372 forwards the child PDU registration request 652 to the IWF 508 for transmission to the first AMF 502.

In response to the request, the first AMF 502 establishes a first child PDU session. Accordingly, a first child PDU session is established for the communications device 270 for the transmission of data via the second infrastructure equipment 372, the IWF 508 and the UPF 506 in accordance with the PN services.

At step S606, the communications device 270 carries out measurements of downlink signals 654 transmitted by the first infrastructure equipment 272 in the first cell 310. The measurements may be initiated in response to a determination that signal strength and/or quality of downlink signals received in the second cell 320 have satisfied predetermined criteria and/or in response to a configuration of the communications device 270 by the second infrastructure equipment 372.

At step S608, the communications device 270 determines that an RRC connection should be established with the first infrastructure equipment 272 in the first cell 310. This may be based on the measurements in step S606. Accordingly, the communications device 270 establishes a second RRC connection 656 with the first infrastructure equipment 272, which may be established broadly in accordance with conventional techniques. The second RRC connection 656 is established while the first RRC connection 650 remains active. This may be achieved by operating parallel protocol stacks at the access stratum level and corresponding RF circuitry, one stack being used for the first RRC connection 650 and the other used for the second RRC connection 656. However, the present disclosure is not so limited and any suitable technique may be used to maintain the parallel RRC connections.

At step S610, having established the second RRC connection 656, the communications device 270 transmits in the first cell 310 an MA PDU registration request 658 via the second RRC connection 656 to the SMF 510. The MA PDU registration request 658 comprises a request to form an MA PDU session based on the first child PDU session (established at step S604) and a (new) second child PDU session for the transmission of data in accordance with the PN services. The MA PDU registration request 658 may comprise an indication of an identity of the first child PDU session.

At step S612, in response to receiving the MA PDU registration request 658, the SMF 510 transmits a PDU session configuration message 660 to the UPF 506. The PDU session configuration message 660 requests that the UPF 506 establish a MA PDU session comprising the first child PDU session and a new (second) child PDU session.

In response to the PDU session configuration message 660, the UPF establishes the second child PDU session for the transmission of data in accordance with registered PN services.

Following the establishment of the second child PDU session, the communications device 270 has two parallel PDU sessions for data associated with the PN services: the first child session 662 in which user plane data is transmitted via the second infrastructure equipment 372, the IWF 508 and the UPF 506, and the second child session 664, in which the user plane data is transmitted via the first infrastructure equipment 272 and the UPF 506.

Coordination of the user plane data may be carried out by a splitting function which may provide functionality substantially similar to that provided by a conventional Access Technology Selection, Steering, Splitting (ATSSS) function as described in [3], and which may be provided by the UPF 506.

Having both first and second child PDU sessions 662, 664 established permits the same user plane data to be transmitted in both the first and second cells 310, 320.

In some embodiments, the splitting function may determine that data may be transmitted with the appropriate quality service requirements via either the first or second child PDU sessions. Accordingly, in order to reduce inefficient use of communications resources, the splitting function may allocate downlink data to one or other of the first and second child PDU sessions.

In some embodiments, the splitting function may determine that it is not possible to ensure that data transmitted via one of the first and second child PDU sessions can be received with the appropriate quality of service requirements. Accordingly, in order to ensure reliable data transmission, the splitting function may allocate downlink data to both of the first and second child PDU sessions.

In some embodiments, at step S614 the communications device 270 determines that data transmission in the second cell 320 should be discontinued. This determination may comprise determining that radio conditions associated with the wireless transmissions in the second cell 320 have satisfied certain predetermined conditions and may be based on measurements of downlink signal strength and/or signal quality and/or on higher layer measurements (e.g. bit error rate or block error rate) measured in respect of uplink or downlink data transmitted in the second cell. In response to the determination, the communications device 270 ceases transmission of the user plane data in the second cell 320.

Subsequently, or as part of step S614, the communications device 270 may detect a radio link failure (RLF) in respect of communications in the second cell 320 and the RRC connection 650 is terminated. However, in contrast to a conventional RLF procedure, in accordance with embodiments of the present technique, the communications device 270 makes no attempt to re-establish the RRC connection 650.

At step S616 the SMF 510 may remove the first child PDU session 662. This may be as a result of the RLF.

In some embodiments, the splitting function may detect that metrics associated with the first child PDU session 662 are unsatisfactory. For example, an available bit rate metric may fall below a predetermined threshold. In response, the splitting function may autonomously cease transmission of downlink user plane data to the communications device 270 via the first child PDU session 662. In some such embodiments, the determination at step S614 by the communications device 270 may be in response to determining that no downlink data is being received via the first child PDU session 662. Similarly, in some embodiments, the determination at step S616 may be in response to the ceasing of the transmission of downlink user plane data traffic via the first child PDU session 662.

In some embodiments, the communications device 270 determines when to release the first child PDU session 662 and, in response, transmits a PDU session release request indication to the first gNB 272 or to the second gNB 372. The determination by the communications device 270 may be based on predetermined criteria being satisfied. The criteria, which may be based on one or more of radio signal quality and radio signal strength measurements in the second cell 320, may be configured by the first or second gNB 272, 372, in advance. The PDU session release request indication may comprise, or be within an RRC message.

In either case, after step S614, the communications device 270 continues to transmit and receive data by means of the second child PDU session 664 by transmitting and receiving the data in the first cell 310 to and from the first infrastructure equipment 272. Because this transition can be substantially instantaneous (that is, there is no time period during which no PDU session is available for the transmission of new data), an interruption of data transmission and reception which may arise in a conventional handover procedure can be avoided.

Thus there is provided a method for handover, having no interruption time, since the communications device 270 always has at least one active RRC connection and is always able to transmit and receive user plane data via at least one PDU session.

Multiple Access Stratum Protocol Stacks

According to some embodiments of the present technique, the communications device 270 is configured to maintain two access stratum connections simultaneously. For example, the communications device 270 may be configured to establish a first RRC connection in the first cell 310 and, without releasing the first RRC connection, to establish a second RRC connection in the second cell 320. While the two access stratum connections are maintained simultaneously, user plane data may be transmitted at all times via at least one of the connections.

The communications device 270 may accordingly have two independently-functioning access stratum protocol stacks, and associated transmitter/receiver functionality to support the operation of both protocol stacks simultaneously. Each of the protocol stacks may be activated or deactivated independently of the other. When a protocol stack is deactivated, certain hardware in the communications device 270 associated with that stack (in particular radio frequency components) may be operated in a lower power mode or disabled entirely, and a processing load for operating the communications device 270 may be reduced.

In a handover scenario, as in the example of FIG. 6, in some embodiments the communications device 270 may initially have a connection only in one cell (the 'source' cell), and may establish a second connection in a second ('target') cell in order to provide continuous service (i.e. without interruption) throughout the handover procedure.

Similarly, in the example illustrated in FIG. 4 and described above, the communications device 270 may establish the RRC connection in the second (target) cell at step S464, while maintaining the RRC connection 402 in the first cell 310.

The use of two protocol stacks can permit a "zero millisecond (msec) user plane interruption" handover, where there is substantially no time during the handover procedure at which at least one RRC connection is established such that user plane data can be transmitted and/or received.

In accordance with some embodiments of the present technique, access control in respect of the target cell is performed prior to the activation of the corresponding protocol stack. That is, while the first connection is maintained in the source cell, the communications device 270 performs an access check to determine whether it is permitted to access the target cell.

In accordance with some embodiments, the handover command may be a conditional handover command. Unlike a conventional (unconditional) handover, in a conditional handover the communications device 270 is informed of the target cell and certain conditions. Only when the certain conditions are satisfied does the communications device 270 initiate connection establishment in the target cell. A conditional handover permits a handover command message to be transmitted earlier and thus more reliably (e.g. before the communications device 270 is outside coverage of the source cell).

As described above, the access check may be based on one or more of a CAG ID, NPN ID, slice ID, APN or other parameters associated with the target cell, and may determine whether or not the communications device 270 is associated with (i.e. has permissions for) those parameters.

In some embodiments, the access check may be carried out by attempting to register with a core network entity associated with the target cell. In some embodiments, a request for such registration may be forwarded within the core network via an IWF as described above.

For example, referring to FIG. 5, the communications device 270 may be currently connected to the first infrastructure equipment 272, and may detect the second cell 320 generated by the second infrastructure equipment 373. In response, the communications device 270 may determine that restrictions on access to the second cell 320 differ from those applicable in the first cell 310. For example, this may because the first cell 310 is a PN cell, while the second cell 320 is a NPN cell.

In response, the communications device 270 may transmit a registration request in the first cell to the first infrastructure equipment 272 for requesting registration with a core network entity (such as the second AMF 504) associated with the second infrastructure equipment 372.

If successful, the communications device 270 may establish two connections (which may be N1 connections as defined in [3]) with different AMFs, while in the same cell. Based on the registration being successful, the communications device 270 determines (without having activated the second protocol stack) that it is permitted to access the second cell 320.

If the communications device 270 determines that it is permitted to access the second cell 320, then it may activate the second stack and, independently of the existence of the existing connection, establish a second access stratum connection in the second cell 320.

If the communications device 270 determines that it is not permitted to access the second cell 320, then it may refrain activate the second stack and, independently of the existence of the existing connection, establish a second access stratum connection in the second cell 320.

Accordingly, the communications device 270 may establish parallel access stratum connections in different cells only after confirming that it is permitted to access the second cell, thereby reducing the power consumption and unnecessary use of the second stack.

In some embodiments, which may relate to handover procedures and scenarios other than handover procedures, the communications device 270 may be registered with two (non-access stratum, NAS) core network entities simultaneously, via a single cell and single infrastructure equipment. For example, the communications device 270 may have two N1 connections to different AMFs, one AMF being associated with a PN (such as the first AMF 502 of FIG. 5), the other (such as the second AMF 504) associated with an NPN.

Conventionally, NAS signalling may be transmitted within an access stratum configuration message, such as an RRC Reconfiguration message. Conventionally, an RRC Reconfiguration message may contain at most one NAS message.

However, there is a need to provide a means for more efficiently transmitting NAS signalling when the communications device 270 has two connections to (i.e. is registered with) different core network entities.

In accordance with embodiments of the present technique, a communications device 270 may receive two or more NAS messages, generated by different core network entities, within a single access stratum (AS) message. In some embodiments, the communications device 270 may within a single access stratum (AS) message one or more NAS messages generated by each of a plurality of different core network entities with which the communications device 270 is registered. In some embodiments, the plurality of different core network entities may be two different core network entities.

In some embodiments, if the communications device 270 has two N1 connections in a cell (which may be a source cell of a handover) then the RRC Reconfiguration message includes space for a plurality of NAS messages to be piggybacked within the same (AS) message. In some embodiments, the plurality of NAS messages may be two NAS messages.

In accordance with further embodiments of the present technique, the communications device 270 may receive a single NAS message generated by one of a plurality of different core network entities with which the communications device is registered within the single access stratum (AS) message, the AS message comprising an indication of the core network entity which generated the NAS message. In some embodiments, the indication of the core network entity comprises an identifier associated with a NAS registration or NAS connection.

Correspondingly, an infrastructure equipment (such as the first infrastructure equipment 272) may determine that the communications device 270 is registered with two different core network entities at the same time. The first infrastructure equipment 272 may receive two (or more) NAS messages for transmission to the communications device 270, including at least one NAS message generated by the first core network entity, and at least one NAS message generated by the second core network entity.

The first infrastructure equipment may form and transmit an access stratum message (such as an RRC Reconfiguration message) which includes at least one NAS message generated by each core network entity.

Additionally or alternatively, in some embodiments, the first infrastructure equipment may transmit an AS message comprising one or more NAS messages and an indication for each of the one or more NAS message indicating which core network entity generated the respective NAS message.

Security Keys

For ensuring the security (confidentiality and integrity) of data transmitted to or by a communications device, security keys may be derived both by the communications device 270 and by corresponding entities within the wireless communications network. For example, each infrastructure equipment may generate keys for the purposes of integrity protection and confidentiality protection (ciphering) of RRC signalling. Conventionally, security keys may be derived from a subscriber identity associated with the communications device 270, as described in [5] and [6].

The inventors of the present application have identified a need to resolve potential ambiguity and/or inconsistency with respect to the use of security keys, in particular arising where a user equipment is associated with both a PN subscription and an NPN subscription.

The communications device 270 may be associated with multiple subscriber identities. For example, the communications device 270 may have multiple subscriptions stored on one or more so-called SIM (subscriber identity module) cards, which may a Universal Integrated Circuit Cards (UICC) having SIM or Universal Subscriber Identity Module (USIM) applications thereon. Each subscription may be associated with a different subscriber identity.

For example, one subscriber identity may be associated with (i.e. permit access to) services provided by an NPN portion of a wireless communications network and another may be associated with services provided by a PN portion of the wireless communications network. Thus, in order to register with a core network entity such as an AMF, the communications device 270 must use the appropriate security keys derived from the identity corresponding to the applicable subscription.

However, in accordance with some embodiments of the present technique, the communications device may be able to access certain services and/or transmit and receive certain in accordance with either of the subscriptions/subscriber identities, for example because a certain service is accessible in accordance with both a PN and an NPN subscription associated with the communications device 270. The inventors of the present disclosure have identified a need to ensure that keys used by the communications device and by network entities, such as the infrastructure equipment, correspond to (i.e. are derived based on) the same subscriber identity. In particular, in a handover scenario, there is a need to ensure that after a handover, the keys used are the same at the communications device and at the infrastructure equipment.

It will be understood that references to 'use of a key' in the present description may encompass 'use of a (further) key derived from the key'. For example, in accordance with conventional techniques, encryption of user plane data transmissions at the access stratum may 'use' a KgNB key by encrypting the user plane data using a key (which may be a $K_{UPenc}$ key) derived from the KgNB key.

In a conventional handover procedure, a new cell key (KgNB*) for use in a new cell for the protection of access stratum messages may be generated both by the communications device and by the infrastructure equipment associated with the current (source) cell. The new cell key (KgNB*) may be derived based on a current cell key (KgNB) and an identity associated with the new cell.

The new cell key KgNB* may be communicated via a trusted interface (e.g. an X2 interface) from the infrastructure equipment associated with the source cell to the infrastructure equipment associated with the target (new) cell. Thus, after the handover, both the communications device and the infrastructure equipment associated with the target cell can communicate using the same key. In the new cell, the KgNB* calculated by the previous infrastructure equipment becomes the current KgNB.

In accordance with embodiments of the present technique, after a handover from a source cell forming part of a public network (such as the first cell 310) to a target cell forming part of a non-public network (such as the second cell 320), the communications device is configured to adapt a current key generated based on a first subscriber identity (such as a PN identity) to a new key generated based on a second subscriber identity (such as an NPN identity). In some embodiments, the identities have different formats.

For example, a PN subscriber permanent identity (SUPI) and an NPN SUPI may have different lengths, or comprise different fields. For example, an NPN SUPI may comprise an NPN ID field to identify a particular NPN (or NPN portion) which the communications device 270 is permitted to access. In contrast, the PN SUPI may not contain an NPN ID field.

Thus, embodiments of the present technique can provide a means to ensure that after a handover, the communications device, infrastructure equipment and core network use a consistent set of security keys.

Figure 7:
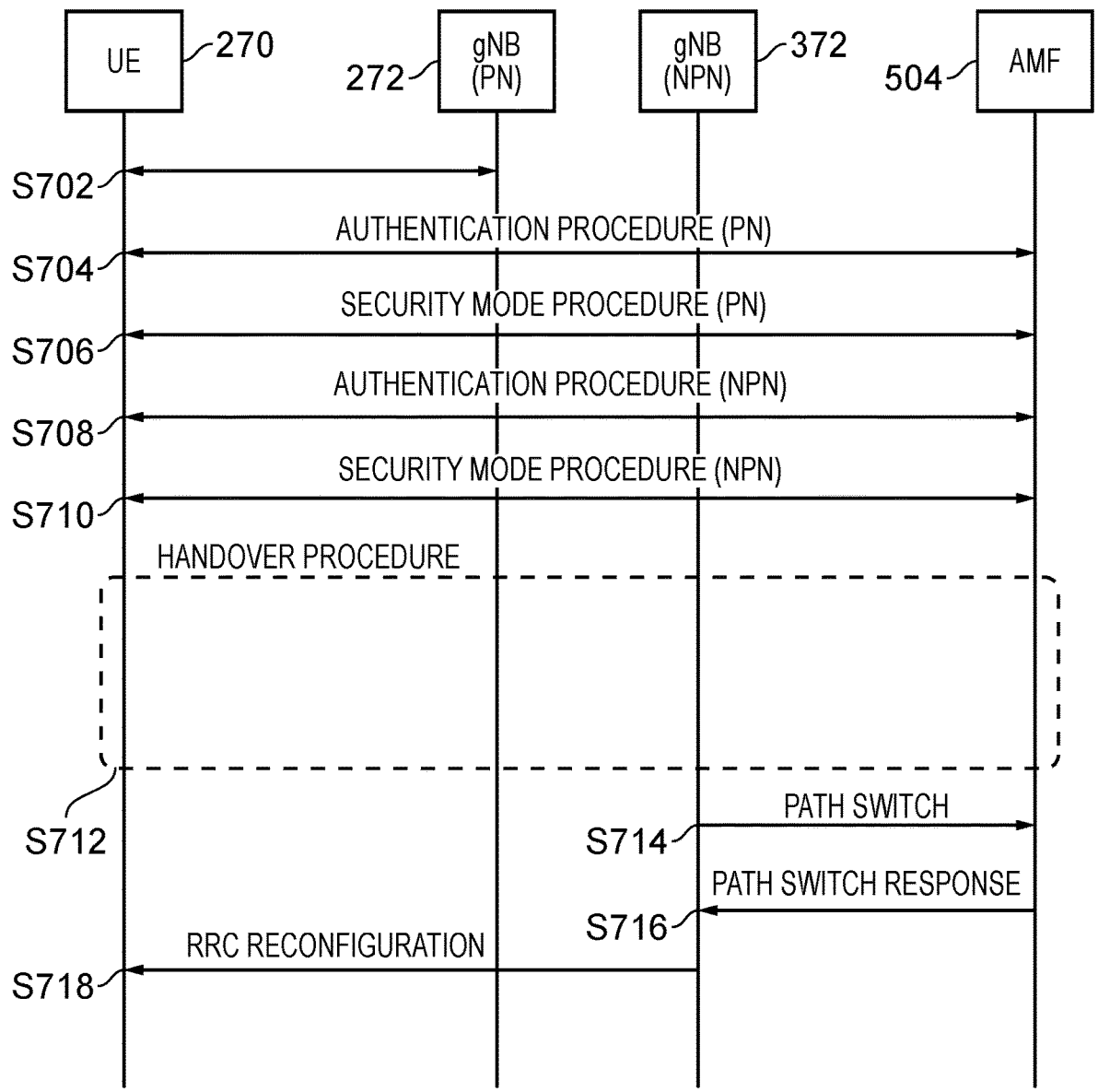
FIG. 7 illustrates a message sequence chart for a handover in accordance with embodiments of the present technique.

FIG. 7 illustrates a message sequence chart for a handover in accordance with embodiments of the present technique.

In the example of FIG. 7, the communications device 270 is initially powered on within the coverage of the first cell 310.

The process starts at step S702, in which the communications device 270 establishes an RRC connection in the first cell 310 with the first infrastructure equipment 272.

Subsequently at step S704, the communications device 270 performs an authentication procedure with the AMF in the core network part 276. The authentication procedure comprises a challenge-response exchange between the AMF and the communications device 270, in which the communications device 270 computes a response to the challenge issued by the AMF, and the AMF validates the response. Secret security parameters associated with a subscription of the communications device 270 (and which may be stored in a USIM application) are used together with the challenge value generated by the AMF in order to generate the correct response.

Based on a successful authentication procedure, the AMF confirms to the first infrastructure equipment 272 that the communications device 270 is permitted to access the first cell 310. The AMF also determines, based on the successful procedure, that the communications device is permitted to access services which it provides.

At step S706, the AMF initiates a security mode procedure for the communications device 270. As a result of the security procedure, the AMF and communications device 270 are able to generate keys for the protection of non-access stratum signalling, and the first infrastructure equipment 272 and the communications device 270 are able to generate keys for the protection of access stratum signalling. In particular, the security mode procedure enables the generation of an access stratum key (KgNB) from which integrity protection and ciphering keys can be derived, for both user plane and control plane transmissions between the communications device 270 and the first infrastructure equipment 272.

In embodiments of the present technique, the procedures of steps S704 and S706 both use credentials and secret information associated with the subscription of the communications device 270 for public network services. Accordingly, the keys derived as a result of the security mode procedure are those based on a first identity (such as a SUPI) associated with a first subscription. Thus, the access stratum key may be a PN access stratum key KgNB(PN).

The authentication procedure and security mode procedure of steps S704 and S706 may be essentially in accordance with conventional techniques.

Subsequently, at steps S708 and S710, the communications device 270 performs an authentication procedure (step S708) and security mode procedure (step S710) with the AMF 276, using credentials and secret information associated with a subscription of the communications device 270 associated with the non-public network. The communications device 270 thus obtains or derives an NPN access stratum key KgNB(NPN).

Accordingly, the communications device determines two keys, each associated with a different subscriber identity, for communications of access stratum data, KgNB(PN) and KgNB(NPN).

Within the first cell 310, access stratum communications (not shown in the Figure) are carried out using KgNB(PN).

At step S712, a handover procedure is carried out, which may comprise the steps S454-S464 of the process illustrated in FIG. 4 and described above.

Prior to, or as part of, the handover procedure S712, the first infrastructure equipment 272 derives a new access stratum key for use in the second cell 320 after the handover. This new access stratum key KgNB* is derived from the key currently being used in the first cell 310, KgNB(PN), and is accordingly denoted by KgNB*(PN).

In some embodiments, the handover request message 408 comprises an indication of the new key KgNB*(PN). In some embodiments, the handover request message 408 is modified to comprise a key indication which indicates the subscriber identity associated with (i.e. which has been used to derive) the key KgNB* to be used by the communications device 270 in the second cell 320 after the handover procedure. In the example of FIG. 7, the key indication indicates that an identity associated with a PN subscription was used. In some embodiments, the key indication may comprise an indication of the identity (e.g. the SUPI) based on which the key was derived. The second infrastructure equipment 372 may determine that the new key was derived from a PN or NPN SUPI as the case may be, based on the format of the identity.

As in the example of FIG. 4, after the communications device 270 is established in the new (second) cell 320 then the second infrastructure equipment 372 transmits a path switch request to the AMF 276. This is at step S714. In some embodiments of the present technique, the path switch request may comprise an key indication which indicates which subscription is associated with the new key KgNB* (PN). In the example of FIG. 7, therefore, the key indication in the path switch message may comprise an indication that the KgNB* configured at the communications device 270 for use in the second cell 320 is derived from a PN identity.

Because the second cell 320 forms part of an NPN portion of the wireless communications network, it is preferable that the communications device 270 use keys associated with its NPN subscription when transmitting and receiving in the second cell 320.

It is further preferable that adaptations to source infrastructure equipment (such as the first infrastructure equipment 272, which may be a PN gNB) required to support NPN network infrastructure equipment is minimised.

In some embodiments, when communicating in the target cell (second cell 320), the communications device 270 may use KgNB*(PN) as its current KgNB, in accordance with conventional principles.

Accordingly, in embodiments of the present technique, the communications device 270 receives a key modification notification to change its current key KgNB*(PN) to a new key. In particular, the new key may be derived based on a different subscription and different subscriber identity than the first key.

The key modification notification may be within an RRC Reconfiguration message.

In the example of FIG. 7, at step S716, the AMF 276 transmits a path switch response to the second infrastructure equipment 372, the path switch response message comprising an indication that the communications device 270 is to change its current key KgNB to a key based on the NPN subscription of the communications device 270. In response, at step S718, the second infrastructure equipment 372 transmits an RRC Reconfiguration message comprising the key modification notification, the key modification notification indicating that that the communications device 270 is to change its current key KgNB to a key based on its NPN subscription.

In response to receiving the RRC Reconfiguration message, the communications device 270 derives, if it has not already done so, KgNB(NPN) for use in the second cell 320, and subsequently uses this for the transmission and reception of access stratum messages in the second cell 320.

In the above description, the determination that the key used by the communications device 270 is to be changed is made by the core network, such as by the AMF 276, and the key modification notification is transmitted by the second infrastructure equipment 372 in response to receiving a corresponding indication from the core network.

In some other embodiments, the decision to transmit the key modification notification is taken by the second infrastructure equipment 372. For example, the key modification notification may be transmitted within an RRC Reconfiguration message by the second infrastructure equipment 372 after the communications device 270 has accessed the second cell 320, independently of the reception of the path switch response. Thus, key reconciliation may occur sooner.

In embodiments of the present technique, either the core network part 276 or the second infrastructure equipment 372 determines that the key modification notification is to be transmitted. This determination may be based on whether the previous cell (i.e. the source cell of the handover, being the first cell 310 in the example of FIG. 7) and the current (target) cell are PN cells or NPN cells, and in particular, whether one is a PN cell and the other is an NPN cell.

Accordingly, in some embodiments, where both the source and target cells are PN cells, or where both the target and source cells are NPN cells, no key modification notification is sent.

In some embodiments, the first infrastructure equipment 272 has stored (for example, as part of a UE context) KgNB(NPN) derived from the procedures at steps S708 and/or S710. In some such embodiments, the first infrastructure equipment 272 determines that the target cell (second cell 320) is an NPN cell and determines KgNB*(NPN) based on KgNB(NPN) and instructs the communications device 270 to similarly use KgNB*(NPN) after the handover, in the new cell.

In some such embodiments, the first infrastructure equipment 272 may indicate to the second infrastructure equipment 272 the key KgNB*(NPN) which will be used by the communications device 270 in the second cell 320. In some such embodiments, no modifications are made to subsequent messages or procedures, since the key used in the second cell 320 will indeed be derived based on the NPN subscription, consistent with the second cell 320 being in an NPN portion of the network.

In some embodiments, the first infrastructure equipment 272 may indicate to the second infrastructure equipment 372 that the communications device 270 is configured to use a key in the new cell which is derived based on the subscriber identity associated with NPN services.

In some embodiments, the first infrastructure equipment 272 does not have stored KgNB(NPN). For example, this may be because the procedures at step S708 and S710 in the example of FIG. 7 may have in fact occurred in a previous serving cell and no UE context is kept for a UE in RRC_IDLE mode.

Nevertheless, the first infrastructure equipment 272 may determine that the target cell is an NPN cell. In response, the first infrastructure equipment 272 may transmit (for example, as part of an RRC Reconfiguration message) an instruction to the communications device 270 to calculate KgNB*(NPN) for use in the target cell, based on KgNB(NPN) which is known to the communications device 270 but not to the first infrastructure equipment 272.

In some such embodiments, the second infrastructure equipment 372 (or the AMF 276 if it is responsible for the decision) may determines that the key in use by the communications device 270 is consistent with the nature of the second cell (i.e. both are associated with NPN services) and accordingly no key modification notification is transmitted.

Although the possibility of inconsistent security keys arises in the example of FIG. 7 in the context of a handover, a similar problem may arise in other circumstances. Accordingly, the scope of the present disclosure is not limited to a handover scenario, but to any scenario where there is a need to ensure consistent key usage arising from different subscriber identities, and in particular where the identities have different formats.

In the example of FIG. 7, the core network entity with which the communications device 270 is registered before and after the handover is the same. However, in some embodiments, the core network entity is changed from a first AMF to a second AMF. In some embodiments, the first AMF may be associated with the PN portion of the wireless communications network, and the second AMF may be associated with the NPN portion of the wireless communications network. As such, the handover may be an inter-AMF handover.

The description above refers to keys used for access stratum communications; however, the disclosure is not so limited and in some embodiments, the communications device receives a key modification notification to change a key or keys used for non-access stratum communications.

In some embodiments, the keys KgNB are determined based on an Extensible Authentication Protocol Method for 3rd Generation Authentication and Key Agreement (EAP-AKA) protocol, such as that specified in RFC 4187.

Described herein are various examples which in some embodiments can be combined. For example, the process illustrated in FIG. 7 may be combined with the process illustrated in FIG. 4. In some embodiments, the steps of the described processes may be modified or re-ordered, and some steps may be omitted.

Embodiments can therefore provide a method of requesting a handover of a communications device in a source cell by a source infrastructure equipment in a wireless communications network, the wireless communications network comprising the source infrastructure equipment and a non public network (NPN) portion comprising a target infrastructure equipment providing a wireless access interface in a target cell, the method comprising: transmitting by the source infrastructure equipment to the target infrastructure equipment, via an interface connecting the source infrastructure equipment and the target infrastructure equipment, a handover request message requesting the handover of the communications device, the handover request comprising an indication of one or more identities associated with non-public cells which the communications device is permitted to access.

Embodiments can further provide a method of operating an infrastructure equipment as a target infrastructure equipment for a handover of a communications device in a wireless communications network, the wireless communications network comprising a source infrastructure equipment and a non public network (NPN) portion, the NPN portion comprising the target infrastructure equipment, the target infrastructure equipment providing a wireless access interface in a target cell, the method comprising: receiving at the target infrastructure equipment a handover request transmitted by the source infrastructure equipment to the target infrastructure equipment, via an interface connecting the source infrastructure equipment and the target infrastructure equipment, the handover request message requesting a handover of the communications device and comprising an indication of one or more identities associated with non-public cells which the communications device is permitted to access.

Embodiments can further provide a method of operating a core network element of a wireless communications network, the wireless communications network comprising a source infrastructure equipment and a non public network (NPN) portion, the NPN portion comprising a target infrastructure equipment, the target infrastructure equipment providing a wireless access interface in a target cell, the method comprising: receiving at the core network element a path switch request message, the path switch request message transmitted by the target infrastructure equipment and requesting that downlink data for transmission to a communications device be transmitted to the target infrastructure equipment, the path switch request comprising an indication of an identity of the communications device and one or more of an indication a non-public network identity associated with the target cell, an indication of a CAG associated with the target cell, and an indication of a network slice associated with the target cell, retrieving one or more identities associated with one or more cells within the non-public network portion which the communications device is permitted to access, determining that the communications device is not permitted to access the target cell, and in response to determining that the communications device is not permitted to access the target cell, transmitting to the target infrastructure equipment a path switch failure message comprising an indication that the communications device is not permitted to access the target cell.

Embodiments can further provide a method of operating an infrastructure equipment in a wireless communications network, the wireless communications network comprising a non public network (NPN) portion, the NPN portion comprising the infrastructure equipment providing a wireless access interface in a cell, the method comprising: establishing a connection between the communications device and the infrastructure equipment in the cell, determining that the communications device is not permitted to access the cell, and transmitting a message to the communications device indicating that the connection between the infrastructure equipment and the communications device is to be released, the message comprising an indication of identities associated with non public network cells which the communications device is permitted to access.

Embodiments can further provide a method of operating a communications device in a wireless communications network, the wireless communications network comprising a non public network (NPN) portion, the NPN portion comprising the infrastructure equipment providing a wireless access interface in a cell, the method comprising: establishing a connection between the communications device and the infrastructure equipment in the cell, receiving a message from the infrastructure equipment indicating that the connection between the infrastructure equipment and the communications device is to be released, the message comprising an indication of identities associated with non public network cells which the communications device is permitted to access.

Embodiments can further provide a method of performing a handover by a communications device in a wireless communications network, the wireless communications network comprising a public network (PN) radio access network (RAN) having a first infrastructure equipment, a non-public network (NPN) RAN having a second infrastructure equipment, and a core network part, the core network part comprising an interworking function for connecting the NPN RAN to a user plane function (UPF), a first control plane entity for providing NPN services, and a second control plane entity for providing PN services, the method comprising: establishing a first connection in an NPN cell with the second infrastructure equipment, while maintaining the first connection, establishing a second connection with the first infrastructure equipment, establishing a multi access protocol data unit (MA PDU) session for transmitting user plane data via the first connection and via the second connection, determining that data should not be transmitted via the first connection, and in response to determining that data should not be transmitted via the first connection, continuing to transmit user plane data only via the second connection.

Embodiments can further provide a method of operating a wireless communications network, the wireless communications network comprising a public network (PN) radio access network (RAN) having a first infrastructure equipment, a non-public network (NPN) RAN having a second infrastructure equipment, and a core network part, the core network part comprising an interworking function for connecting the NPN RAN to a user plane function (UPF), a first control plane entity for providing NPN services, and a second control plane entity for providing PN services, the method comprising: establishing a first connection in an NPN cell between the second infrastructure equipment and a communications device, while maintaining the first connection, establishing a second connection between the first infrastructure equipment and the communications device, establishing a multi access protocol data unit (MA PDU) session for transmitting user plane data via the first connection and via the second connection, determining that data should not be transmitted via the first connection, and in response to determining that data should not be transmitted via the first connection, continuing to transmit user plane data only via the second connection.

Embodiments can further provide a wireless communications network comprising: a first infrastructure equipment providing a first wireless access interface in a first cell, a second infrastructure equipment providing a second wireless access interface in a second cell, a core network part, the core network part comprising a user plane function (UPF) for routing user plane data within the core network and to an external packet data network, the UPF connected to the first infrastructure equipment, an interworking function connected to the second infrastructure equipment and to the UPF, a first control plane entity connected to the first infrastructure equipment, and a second control plane entity connected to the second infrastructure equipment via the interworking function, wherein one of the first infrastructure equipment and the second infrastructure equipment form a part of a non-public network to which access is restricted to a portion of subscribers of the wireless communications network.

Embodiments can further provide a method of receiving non-access stratum messages by a communications device in a wireless communications network, the wireless communications network comprising first and second core network entities and an infrastructure equipment providing a wireless access interface for a cell, the method comprising registering with the first core network entity, while registered with the first core network entity, registering with the second core network entity, receiving in the cell an access stratum message transmitted by the infrastructure equipment, the access stratum message comprising a first non-access stratum message generated by the first core network entity and a second non-access stratum message generated by the second core network entity.

Embodiments can further provide a method of receiving a non-access stratum message by a communications device in a wireless communications network, the wireless communications network comprising first and second core network entities and an infrastructure equipment providing a wireless access interface for a cell, the method comprising registering with a first core network entity, while registered with the first core network entity, registering with the second core network entity, receiving in the cell an access stratum message transmitted by the infrastructure equipment, the access stratum message comprising a non-access stratum message generated by one of the first core network entity and the second core network entity and an indication of which of the first core network entity and the second core network entity generated the non-access stratum message.

Embodiments can further provide a method comprising receiving downlink signals transmitted in a second cell by a second infrastructure equipment, determining that the second cell satisfies predetermined criteria for a target cell of a handover procedure, wherein the second core network entity is associated with the second infrastructure equipment, and registering with the second core network entity is in response to determining that the second cell satisfies the predetermined criteria for a target cell of a handover procedure.

Embodiments can further provide a method of transmitting non-access stratum messages by an infrastructure equipment in a wireless communications network, the wireless communications network comprising first and second core network entities and the infrastructure equipment providing a wireless access interface for a cell, the method comprising receiving from the first core network entity a first non-access stratum message for transmission to a communications device, receiving from the second core network entity a second non-access stratum message for transmission to the communications device, transmitting in the cell to the communications device an access stratum message comprising the first non-access stratum message and the second non-access stratum message.

Embodiments can further provide a method of transmitting a non-access stratum message by an infrastructure equipment in a wireless communications network, the wireless communications network comprising first and second core network entities and the infrastructure equipment providing a wireless access interface for a cell, the method comprising determining that the communications device is registered with the first core network entity and the second core network entity, receiving from the first core network entity a non-access stratum message for transmission to a communications device, transmitting in the cell to the communications device the access stratum message comprising the non-access stratum message and an indication that the first core network entity generated the non-access stratum message.

Embodiments can further provide a method of operating a communications device in a wireless communications network, the wireless communications network comprising a first infrastructure equipment providing a wireless access interface in a first cell, a second infrastructure equipment providing a wireless access interface in a second cell, and a core network part, the method comprising: deriving a first security key for transmitting data in the first cell based on a first subscriber identity associated with the communications device, deriving a second security key for transmitting data in the second cell, the second security key being derived based on the first security key, performing a handover to the second cell, receiving a key change indication transmitted by the second infrastructure equipment, and in response to receiving the key change indication, using a third key for transmitting data in the second cell, the third key based on a second subscriber identity associated with the communications device.

Embodiments can further provide a method of operating a second infrastructure equipment in a wireless communications network, the wireless communications network comprising a first infrastructure equipment in a public network portion of the wireless communications network providing a wireless access interface in a first cell, the second infrastructure equipment in a non-public network portion of the wireless communications network providing a wireless access interface in a second cell, and a core network part, the method comprising: receiving a request from the first infrastructure equipment for a handover of a communications device from the first cell to the second cell, receiving an indication of a second security key for transmitting data to the communications device in the second cell after the handover, the indication transmitted by the first infrastructure equipment, the second security key derived based on a first subscriber identity associated with the communications device, establishing a connection with the communications device in the second cell, and transmitting a key change indication to the communications device, the key change indication requesting the communications device to use a third key for transmitting data in the second cell, the third key based on a second subscriber identity associated with the communications device.

Corresponding infrastructure equipment, communications devices and core network entities and circuitry, and computer readable media are also provided by embodiments of the present disclosure.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communications devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system having a non-public network portion to which access is restricted.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of requesting a handover of a communications device in a source cell by a source infrastructure equipment in a wireless communications network, the wireless communications network comprising the source infrastructure equipment and a non public network (NPN) portion comprising a target infrastructure equipment providing a wireless access interface in a target cell, the method comprising: transmitting by the source infrastructure equipment to the target infrastructure equipment, via an interface connecting the source infrastructure equipment and the target infrastructure equipment, a handover request message requesting the handover of the communications device, the handover request comprising an indication of one or more identities associated with non-public cells which the communications device is permitted to access.

Paragraph 2. A method according to paragraph 1, wherein the one or more identities comprise one or more of: a non-public network identity, a closed access group identity, a slice identifier, and an access point name.

Paragraph 3. A method according to paragraph 1 or paragraph 2, wherein the wireless communications network comprises a PN portion comprising the source infrastructure equipment providing a wireless access interface in the source cell.

Paragraph 4. A method according to paragraph 1 or paragraph 2, wherein access to the source cell is restricted to one or more closed access groups (CAGs), and the one or more identities comprise an indication of the one or more closed access groups associated with the source cell.

Paragraph 5. A method according to any of paragraphs 1 to 4, the method comprising receiving a list of CAGs associated with the communications device, the CAGs corresponding to NPN cells which the communications device is permitted to access, wherein the indication of the one or more identities associated with the non-public cells which the communications device is permitted to access comprises the list of CAGs.

Paragraph 6. A method according to any of paragraphs 1 to 5, the method comprising receiving via the interface a handover response message indicating that the handover may proceed, and transmitting via a wireless access interface of the source cell a handover command to the communications device.

Paragraph 7. A method according to any of paragraphs 1 to 5, the method comprising receiving via the interface an indication that the communications device is not permitted to access the target cell.

8. A method according to any of paragraphs 1 to 7, wherein the handover request comprises a key for transmission and reception of access stratum data in the target cell and an indication of a type of subscriber identity used to derive the key.

Paragraph 9. A method according to paragraph 8, wherein the type of subscriber identity is selected from a plurality of types of subscriber identity, each of the plurality of subscriber identities associated with a different format.

Paragraph 10. A method according to paragraph 8 or paragraph 9, wherein the type of subscriber identity is one of a PN subscriber identity and a NPN subscriber identity.

Paragraph 11. A method of operating an infrastructure equipment as a target infrastructure equipment for a handover of a communications device in a wireless communications network, the wireless communications network comprising a source infrastructure equipment and a non public network (NPN) portion, the NPN portion comprising the target infrastructure equipment, the target infrastructure equipment providing a wireless access interface in a target cell, the method comprising: receiving at the target infrastructure equipment a handover request transmitted by the source infrastructure equipment to the target infrastructure equipment, via an interface connecting the source infrastructure equipment and the target infrastructure equipment, the handover request message requesting a handover of the communications device and comprising an indication of one or more identities associated with non-public cells which the communications device is permitted to access.

Paragraph 12. A method according to paragraph 11, the method comprising receiving from the communications device an indication that the communications device is permitted to access the target cell.

Paragraph 13. A method according to paragraph 11 or paragraph 12, the method comprising establishing a connection with the communications device in the target cell, and determining that the communications device is not permitted to access the target cell.

Paragraph 14. A method according to paragraph 13, the method comprising in response to determining that the communications device is not permitted to access the target cell, transmitting to the communications device an indication to release a connection with the target infrastructure equipment in the target cell, the indication to release the connection with the communications device comprising an indication that the communications device is not permitted to access the target cell.

Paragraph 15. A method according to paragraph 13 or paragraph 14, wherein determining that the communications device is not permitted to access the target cell comprises receiving from the communications device an indication that the communications device is not permitted to access the target cell.

Paragraph 16. A method according to paragraph 13 or paragraph 14, the method comprising transmitting a path switch request message to a core network part of the wireless communications network, the path switch request message comprising an indication of an identity of the communications device, wherein determining that the communications device is not permitted to access the target cell comprises receiving from the core network part a path switch failure message comprising an indication that the communications device is not permitted to access the target cell.

Paragraph 17. A method according to paragraph 16, wherein the path switch request message comprises one or more of an indication a non-public network identity associated with the target cell, an indication of a CAG associated with the target cell, and an indication of a network slice associated with the target cell.

Paragraph 18. A method according to paragraph 16 or paragraph 17, wherein the path switch failure message comprises an indication of one or more identities associated with non public network cells which the communications device is permitted to access.

Paragraph 19. A method according to paragraph 18, the method comprising in response to receiving the path switch failure message, transmitting an indication of the one or more identities associated with non public network cells which the communications device is permitted to access to the communications device.

Paragraph 20. A method according to paragraph 19, wherein transmitting the indication of the one or more identities associated with non public network cells which the communications device is permitted to access to the communications device comprises transmitting a message indicating that the connection between the target infrastructure equipment and the communications device is to be released.

Paragraph 21. A method of operating a core network element of a wireless communications network, the wireless communications network comprising a source infrastructure equipment and a non public network (NPN) portion, the NPN portion comprising a target infrastructure equipment, the target infrastructure equipment providing a wireless access interface in a target cell, the method comprising: receiving at the core network element a path switch request message, the path switch request message transmitted by the target infrastructure equipment and requesting that downlink data for transmission to a communications device be transmitted to the target infrastructure equipment, the path switch request comprising an indication of an identity of the communications device and one or more of an indication a non-public network identity associated with the target cell, an indication of a CAG associated with the target cell, and an indication of a network slice associated with the target cell, retrieving one or more identities associated with one or more cells within the non-public network portion which the communications device is permitted to access, determining that the communications device is not permitted to access the target cell, and in response to determining that the communications device is not permitted to access the target cell, transmitting to the target infrastructure equipment a path switch failure message comprising an indication that the communications device is not permitted to access the target cell.

Paragraph 22. A method according to paragraph 21, the method comprising transmitting to the target infrastructure equipment the retrieved one or more identities associated with non-public cells which the communications device is permitted to access.

Paragraph 23. A method of operating an infrastructure equipment in a wireless communications network, the wireless communications network comprising a non public network (NPN) portion, the NPN portion comprising the infrastructure equipment providing a wireless access interface in a cell, the method comprising: establishing a connection between a communications device and the infrastructure equipment in the cell, determining that the communications device is not permitted to access the cell, and transmitting a message to the communications device indicating that the connection between the infrastructure equipment and the communications device is to be released, the message comprising an indication of identities associated with non public network cells which the communications device is permitted to access.

Paragraph 24. A method according to paragraph 23, the method comprising receiving from a core network entity the indication of the one or more identities associated with non public network cells which the communications device is permitted to access Paragraph 25. A method according to paragraph 23 or paragraph 24, wherein according to the indication of identities associated with non public network cells which the communications device is permitted to access, the communications device is not permitted to access any non public network cells.

Paragraph 26. A method of operating a communications device in a wireless communications network, the wireless communications network comprising a non public network (NPN) portion, the NPN portion comprising the infrastructure equipment providing a wireless access interface in a cell, the method comprising: establishing a connection between the communications device and the infrastructure equipment in the cell, receiving a message from the infrastructure equipment indicating that the connection between the infrastructure equipment and the communications device is to be released, the message comprising an indication of identities associated with non public network cells which the communications device is permitted to access.

Paragraph 27. A method according to paragraph 26, wherein according to the indication of identities associated with non public network cells which the communications device is permitted to access, the communications device is not permitted to access any non public network cells.

Paragraph 28. A method of performing a handover by a communications device in a wireless communications network, the wireless communications network comprising a public network (PN) radio access network (RAN) having a first infrastructure equipment, a non-public network (NPN) RAN having a second infrastructure equipment, and a core network part, the core network part comprising an interworking function for connecting the NPN RAN to a user plane function (UPF), a first control plane entity for providing NPN services, and a second control plane entity for providing PN services, the method comprising: establishing a first connection in an NPN cell with the second infrastructure equipment, while maintaining the first connection, establishing a second connection with the first infrastructure equipment, establishing a multi access protocol data unit (MA PDU) session for transmitting user plane data via the first connection and via the second connection, determining that data should not be transmitted via the first connection, and in response to determining that data should not be transmitted via the first connection, continuing to transmit user plane data only via the second connection.

29. A method according to paragraph 28, the method comprising: performing measurements of at least one of a signal quality and a signal strength of downlink signals transmitted in a PN cell controlled by the first infrastructure equipment, wherein establishing the second connection is in response to determining that the at least one of the signal quality and the signal strength satisfy predetermined criteria.

30. A method according to paragraph 28 or paragraph 29, the method comprising: registering for an NPN service with the first control plane entity by transmitting a first registration request to the second infrastructure equipment via the first connection, registering for a PN service with the second control plane entity by transmitting a second registration request to the second infrastructure equipment via the first connection, wherein the second connection is established while registered for the NPN service and the PN service Paragraph 31. A method according to any of paragraphs 28 to 30, the method comprising before establishing the multi access protocol data unit (MA PDU) session, transmitting using the second connection a registration request, the registration request requesting a registration of the communications device with a core network entity providing PN services and comprising an identity of the communications device allocated by the first core network entity.

Paragraph 32. A method according to any of paragraphs 28 to 31, the method comprising, in response to determining that data should not be transmitted via the first connection, transmitting a session release request indication to one of the first infrastructure equipment and the second infrastructure equipment.

Paragraph 33. A method according to any of paragraphs 28 to 32, the method comprising measuring received radio signals transmitted by the second infrastructure equipment to determine one or more of a signal quality and a signal strength, wherein determining that data should not be transmitted via the first connection comprises determining that the one or more of the signal quality and the signal strength satisfy predetermined criteria.

Paragraph 34. A method according to paragraph 33, the method comprising receiving an indication of the predetermined criteria from one of the first infrastructure equipment and the second infrastructure equipment.

Paragraph 35. A method according to any of paragraphs 28 to 34, wherein determining that the data should not be transmitted via the first connection comprises detecting a failure of a radio link in the NPN cell.

Paragraph 36. A method of operating a wireless communications network, the wireless communications network comprising a public network (PN) radio access network (RAN) having a first infrastructure equipment, a non-public network (NPN) RAN having a second infrastructure equipment, and a core network part, the core network part comprising an interworking function for connecting the NPN RAN to a user plane function (UPF), a first control plane entity for providing NPN services, and a second control plane entity for providing PN services, the method comprising: establishing a first connection in an NPN cell between the second infrastructure equipment and a communications device, while maintaining the first connection, establishing a second connection between the first infrastructure equipment and the communications device, establishing a multi access protocol data unit (MA PDU) session for transmitting user plane data via the first connection and via the second connection, determining that data should not be transmitted via the first connection, and in response to determining that data should not be transmitted via the first connection, continuing to transmit user plane data only via the second connection.

Paragraph 37. A wireless communications network comprising: a first infrastructure equipment providing a first wireless access interface in a first cell, a second infrastructure equipment providing a second wireless access interface in a second cell, a core network part, the core network part comprising a user plane function (UPF) for routing user plane data within the core network and to an external packet data network, the UPF connected to the first infrastructure equipment, an interworking function connected to the second infrastructure equipment and to the UPF, a first control plane entity connected to the first infrastructure equipment, and a second control plane entity connected to the second infrastructure equipment via the interworking function, wherein one of the first infrastructure equipment and the second infrastructure equipment form a part of a non-public network to which access is restricted to a portion of subscribers of the wireless communications network.

Paragraph 38. A wireless communications network according to paragraph 37, wherein the UPF is configured to support a multi access (MA) protocol data unit (PDU) session for a communications device, the MA PDU session permitting the transmission of data associated with a single PDU session to the communications device via both of the first infrastructure equipment and the second infrastructure equipment.

Paragraph 39. A method of receiving non-access stratum messages by a communications device in a wireless communications network, the wireless communications network comprising first and second core network entities and an infrastructure equipment providing a wireless access interface for a cell, the method comprising registering with the first core network entity, while registered with the first core network entity, registering with the second core network entity, receiving in the cell an access stratum message transmitted by the infrastructure equipment, the access stratum message comprising a first non-access stratum message generated by the first core network entity and a second non-access stratum message generated by the second core network entity.

Paragraph 40. A method of receiving a non-access stratum message by a communications device in a wireless communications network, the wireless communications network comprising first and second core network entities and an infrastructure equipment providing a wireless access interface for a cell, the method comprising registering with the first core network entity, while registered with the first core network entity, registering with the second core network entity, receiving in the cell an access stratum message transmitted by the infrastructure equipment, the access stratum message comprising a non-access stratum message generated by one of the first core network entity and the second core network entity and an indication of which of the first core network entity and the second core network entity generated the non-access stratum message.

Paragraph 41. A method according to paragraph 39 or paragraph 40, the method comprising receiving downlink signals transmitted in a second cell by a second infrastructure equipment, determining that the second cell satisfies predetermined criteria for a target cell of a handover procedure, wherein the second core network entity is associated with the second infrastructure equipment, and registering with the second core network entity is in response to determining that the second cell satisfies the predetermined criteria for a target cell of a handover procedure.

Paragraph 42. A method of transmitting non-access stratum messages by an infrastructure equipment in a wireless communications network, the wireless communications network comprising first and second core network entities and the infrastructure equipment providing a wireless access interface for a cell, the method comprising receiving from the first core network entity a first non-access stratum message for transmission to a communications device, receiving from the second core network entity a second non-access stratum message for transmission to the communications device, and transmitting in the cell to the communications device an access stratum message comprising the first non-access stratum message and the second non-access stratum message.

Paragraph 43. A method of transmitting a non-access stratum message by an infrastructure equipment in a wireless communications network, the wireless communications network comprising first and second core network entities and the infrastructure equipment providing a wireless access interface for a cell, the method comprising determining that the communications device is registered with the first core network entity and the second core network entity, receiving from the first core network entity a non-access stratum message for transmission to a communications device, and transmitting in the cell to the communications device the access stratum message comprising the non-access stratum message and an indication that the first core network entity generated the non-access stratum message.

Paragraph 44. A method according to any of paragraphs 39 to 43, wherein the first core network entity is associated with a public network (PN) and the second core network entity is associated with a non-public network (NPN).

Paragraph 45. A method according to any of paragraphs 39 to 44 wherein the access stratum message is an RRC Reconfiguration message.

Paragraph 46. A method according to any of paragraphs 39 to 45, wherein the first core network entity and the second core network entity are Access and Mobility Management Functions.

Paragraph 47. A method of operating a communications device in a wireless communications network, the wireless communications network comprising a first infrastructure equipment providing a wireless access interface in a first cell, a second infrastructure equipment providing a wireless access interface in a second cell, and a core network part, the method comprising: deriving a first security key for transmitting data in the first cell based on a first subscriber identity associated with the communications device, deriving a second security key for transmitting data in the second cell, the second security key being derived based on the first security key, performing a handover to the second cell, receiving a key change indication transmitted by the second infrastructure equipment, and in response to receiving the key change indication, using a third key for transmitting data in the second cell, the third key based on a second subscriber identity associated with the communications device.

Paragraph 48. A method according to paragraph 47, wherein the first subscriber identity is associated with a subscription for non-public network services.

Paragraph 49. A method according to paragraphs 47 or paragraph 48, wherein the second subscriber identity is associated with a subscription for public network services.

Paragraph 50. A method according to any of paragraphs 47 to 49, wherein a format of the first subscriber identity is different from a format of the second subscriber identity.

Paragraph 51. A method according to any of paragraphs 47 to 50, wherein deriving the first security key is in response to performing a security mode procedure with a first core network entity, the method comprising deriving the second security key in response to performing a security mode procedure with the first core network entity.

Paragraph 52. A method according to any of paragraphs 47 to 51, wherein receiving the key change indication comprises receiving a radio resource control (RRC) reconfiguration message from the second infrastructure.

Paragraph 53. A method according to any of paragraphs 47 to 52, wherein the first security key is used to derive keys for integrity protection and ciphering of user plane data transmitted in the first cell.

Paragraph 54. A method of operating a second infrastructure equipment in a wireless communications network, the wireless communications network comprising a first infrastructure equipment in a public network portion of the wireless communications network providing a wireless access interface in a first cell, the second infrastructure equipment in a non-public network portion of the wireless communications network providing a wireless access interface in a second cell, and a core network part, the method comprising: receiving a request from the first infrastructure equipment for a handover of a communications device from the first cell to the second cell, receiving an indication of a second security key for transmitting data to the communications device in the second cell after the handover, the indication transmitted by the first infrastructure equipment, the second security key derived based on a first subscriber identity associated with the communications device, establishing a connection with the communications device in the second cell, and transmitting a key change indication to the communications device, the key change indication requesting the communications device to use a third key for transmitting data in the second cell, the third key based on a second subscriber identity associated with the communications device.

Paragraph 55. A method according to paragraph 54, the method comprising: after establishing the connection with the communications device in the second cell, transmitting a path switch request to the core network part, the path switch request comprising an indication that the second key is derived based on the first subscriber identity, receiving from the core network part a path switch response, the path switch response comprising an indication that transmissions with the communications device in the second cell are to use a key derived from the second subscriber identity, wherein transmitting a key change indication to the communications device is in response to receiving the path switch response.

Paragraph 56. A method according to paragraph 54 or paragraph 55, wherein the first subscriber identity is associated with a subscription for non-public network services.

Paragraph 57. A method according to any of paragraphs 54 to 56, wherein the second subscriber identity is associated with a subscription for public network services.

Paragraph 58. A method according to any of paragraphs 54 to 57, wherein a format of the first subscriber identity is different from a format of the second subscriber identity.

Paragraph 59. Infrastructure equipment for use in a wireless communications network, the infrastructure equipment providing a wireless access interface in a source cell, wherein the wireless access interface is for the transmission of data to and the reception of data from a communications device, the wireless communications network comprising the infrastructure equipment and a non public network (NPN) portion comprising a target infrastructure equipment providing a wireless access interface in a target cell, the infrastructure equipment comprising a transmitter configured to transmit signals to the communications device via the wireless access interface in the source cell, a receiver configured to receive data from the communications device, and a controller configured to control the transmitter and the receiver so that the infrastructure equipment is operable: to transmit to the target infrastructure equipment, via an interface connecting the infrastructure equipment and the target infrastructure equipment, a handover request message requesting the handover of the communications device, the handover request comprising an indication of one or more identities associated with non-public cells which the communications device is permitted to access.

Paragraph 60. Circuitry for infrastructure equipment for use in a wireless communications network, the infrastructure equipment providing a wireless access interface in a source cell, wherein the wireless access interface is for the transmission of data to and the reception of data from a communications device, the wireless communications network comprising the infrastructure equipment and a non public network (NPN) portion comprising a target infrastructure equipment providing a wireless access interface in a target cell, the circuitry comprising transmitter circuitry configured to transmit signals to the communications device via the wireless access interface in the source cell, receiver circuitry configured to receive data from the communications device, and controller circuitry configured to control the transmitter circuitry and the receiver circuitry so that the infrastructure equipment is operable: to transmit to the target infrastructure equipment, via an interface connecting the infrastructure equipment and the target infrastructure equipment, a handover request message requesting the handover of the communications device, the handover request comprising an indication of one or more identities associated with non-public cells which the communications device is permitted to access.

Paragraph 61. Infrastructure equipment for use in a wireless communications network, the infrastructure equipment providing a wireless access interface in a target cell, wherein the wireless access interface is for the transmission of data to and the reception of data from a communications device, the wireless communications network comprising a source infrastructure equipment and a non public network (NPN) portion, the NPN portion comprising the infrastructure equipment, the infrastructure equipment comprising a transmitter configured to transmit signals to the communications device via the wireless access interface in the target cell, a receiver configured to receive data from the communications device, and a controller configured to control the transmitter and the receiver so that the infrastructure equipment is operable: to receive a handover request transmitted by the source infrastructure equipment to the target infrastructure equipment, via an interface connecting the source infrastructure equipment and the target infrastructure equipment, the handover request message requesting a handover of the communications device and comprising an indication of one or more identities associated with non-public cells which the communications device is permitted to access.

Paragraph 62. Circuitry for infrastructure equipment for use in a wireless communications network, the infrastructure equipment providing a wireless access interface in a target cell, wherein the wireless access interface is for the transmission of data to and the reception of data from a communications device, the wireless communications network comprising a source infrastructure equipment and a non public network (NPN) portion, the NPN portion comprising the infrastructure equipment, the circuitry comprising transmitter circuitry configured to transmit signals to the communications device via the wireless access interface in the target cell, receiver circuitry configured to receive data from the communications device, and controller circuitry configured to control the transmitter circuitry and the receiver circuitry so that the infrastructure equipment is operable: to receive a handover request transmitted by the source infrastructure equipment to the target infrastructure equipment, via an interface connecting the source infrastructure equipment and the target infrastructure equipment, the handover request message requesting a handover of the communications device and comprising an indication of one or more identities associated with non-public cells which the communications device is permitted to access.

Paragraph 63. A core network element of a wireless communications network, the wireless communications network comprising a source infrastructure equipment and a non public network (NPN) portion, the NPN portion comprising a target infrastructure equipment, the target infrastructure equipment providing a wireless access interface in a target cell, the core network element comprising a controller configured to control the core network element so that the core network element is operable: to receive a path switch request message, the path switch request message transmitted by the target infrastructure equipment and requesting that downlink data for transmission to a communications device be transmitted to the target infrastructure equipment, the path switch request comprising an indication of an identity of the communications device and one or more of an indication a non-public network identity associated with the target cell, an indication of a CAG associated with the target cell, and an indication of a network slice associated with the target cell, to retrieve one or more identities associated with one or more cells within the non-public network portion which the communications device is permitted to access, to determine that the communications device is not permitted to access the target cell, and in response to determining that the communications device is not permitted to access the target cell, to transmit to the target infrastructure equipment a path switch failure message comprising an indication that the communications device is not permitted to access the target cell.

Paragraph 64. Circuitry for a core network element of a wireless communications network, the wireless communications network comprising a source infrastructure equipment and a non public network (NPN) portion, the NPN portion comprising a target infrastructure equipment, the target infrastructure equipment providing a wireless access interface in a target cell, the circuitry comprising controller circuitry configured to control the core network element so that the core network element is operable: to receive a path switch request message, the path switch request message transmitted by the target infrastructure equipment and requesting that downlink data for transmission to a communications device be transmitted to the target infrastructure equipment, the path switch request comprising an indication of an identity of the communications device and one or more of an indication a non-public network identity associated with the target cell, an indication of a CAG associated with the target cell, and an indication of a network slice associated with the target cell, to retrieve one or more identities associated with one or more cells within the non-public network portion which the communications device is permitted to access, to determine that the communications device is not permitted to access the target cell, and in response to determining that the communications device is not permitted to access the target cell, to transmit to the target infrastructure equipment a path switch failure message comprising an indication that the communications device is not permitted to access the target cell.

Paragraph 65. Infrastructure equipment for use in a wireless communications network, the wireless communications network comprising a non public network (NPN) portion, the NPN portion comprising the infrastructure equipment providing a wireless access interface in a cell, the infrastructure equipment comprising a transmitter configured to transmit signals to a communications device via the wireless access interface in the target cell, a receiver configured to receive data from the communications device, and a controller configured to control the transmitter and the receiver so that the infrastructure equipment is operable: to establish a connection between the communications device and the infrastructure equipment in the cell, to determine that the communications device is not permitted to access the cell, and to transmitting a message to the communications device indicating that the connection between the infrastructure equipment and the communications device is to be released, the message comprising an indication of identities associated with non public network cells which the communications device is permitted to access.

Paragraph 66. Circuitry for infrastructure equipment for use in a wireless communications network, the wireless communications network comprising a non public network (NPN) portion, the NPN portion comprising the infrastructure equipment providing a wireless access interface in a cell, the circuitry comprising transmitter circuitry configured to transmit signals to a communications device via the wireless access interface in the target cell, receiver circuitry configured to receive data from the communications device, and controller circuitry configured to control the transmitter circuitry and the receiver circuitry so that the infrastructure equipment is operable: to establish a connection between the communications device and the infrastructure equipment in the cell, to determine that the communications device is not permitted to access the cell, and to transmitting a message to the communications device indicating that the connection between the infrastructure equipment and the communications device is to be released, the message comprising an indication of identities associated with non public network cells which the communications device is permitted to access.

Paragraph 67. A communications device, the communications device comprising a transmitter configured to transmit signals via a wireless access interface provided by an infrastructure equipment of a wireless communications network, the wireless communications network comprising a non public network (NPN) portion, the NPN portion comprising the infrastructure equipment, a receiver configured to receive signals via the wireless access interface, and a controller configured to control the transmitter and the receiver so that the communications device is operable: to establish a connection between the communications device and the infrastructure equipment in the cell, to receive a message from the infrastructure equipment indicating that the connection between the infrastructure equipment and the communications device is to be released, the message comprising an indication of identities associated with non public network cells which the communications device is permitted to access.

Paragraph 68. Circuitry for a communications device, the circuitry comprising transmitter circuitry configured to transmit signals via a wireless access interface provided by an infrastructure equipment of a wireless communications network, the wireless communications network comprising a non public network (NPN) portion, the NPN portion comprising the infrastructure equipment, receiver circuitry configured to receive signals via the wireless access interface, and controller circuitry configured to control the transmitter circuitry and the receiver circuitry so that the communications device is operable: to establish a connection between the communications device and the infrastructure equipment in the cell, to receive a message from the infrastructure equipment indicating that the connection between the infrastructure equipment and the communications device is to be released, the message comprising an indication of identities associated with non public network cells which the communications device is permitted to access.

Paragraph 69. A communications device, the communications device comprising a transmitter configured to transmit signals via a wireless access interface provided by a first infrastructure equipment of a wireless communications network, the wireless communications network comprising a public network (PN) radio access network (RAN) having the first infrastructure equipment, a non-public network (NPN) RAN having a second infrastructure equipment, and a core network part, the core network part comprising an interworking function for connecting the NPN RAN to a user plane function (UPF), a first control plane entity for providing NPN services, and a second control plane entity for providing PN services, a receiver configured to receive signals via the wireless access interface, and a controller configured to control the transmitter and the receiver so that the communications device is operable: to establish a first connection in an NPN cell with the second infrastructure equipment, while maintaining the first connection, to establish a second connection with the first infrastructure equipment, to establish a multi access protocol data unit (MA PDU) session for transmitting user plane data via the first connection and via the second connection, to determine that data should not be transmitted via the first connection, and in response to determining that data should not be transmitted via the first connection, to continue to transmit user plane data only via the second connection.

Paragraph 70. Circuitry for a communications device, the circuitry comprising transmitter circuitry configured to transmit signals via a wireless access interface provided by a first infrastructure equipment of a wireless communications network, the wireless communications network comprising a public network (PN) radio access network (RAN) having the first infrastructure equipment, a non-public network (NPN) RAN having a second infrastructure equipment, and a core network part, the core network part comprising an interworking function for connecting the NPN RAN to a user plane function (UPF), a first control plane entity for providing NPN services, and a second control plane entity for providing PN services, receiver circuitry configured to receive signals via the wireless access interface, and controller circuitry configured to control the transmitter circuitry and the receiver circuitry so that the communications device is operable: to establish a first connection in an NPN cell with the second infrastructure equipment, while maintaining the first connection, to establish a second connection with the first infrastructure equipment, to establish a multi access protocol data unit (MA PDU) session for transmitting user plane data via the first connection and via the second connection, to determine that data should not be transmitted via the first connection, and in response to determining that data should not be transmitted via the first connection, to continue to transmit user plane data only via the second connection.

Paragraph 71. A communications device, the communications device comprising a transmitter configured to transmit signals via a wireless access interface provided by an infrastructure equipment of a wireless communications network, the wireless communications network comprising first and second core network entities and the infrastructure equipment providing the wireless access interface for a cell, a receiver configured to receive signals via the wireless access interface, and a controller configured to control the transmitter and the receiver so that the communications device is operable: to register with the first core network entity, while registered with the first core network entity, to register with the second core network entity, to receive in the cell an access stratum message transmitted by the infrastructure equipment, the access stratum message comprising a first non-access stratum message generated by the first core network entity and a second non-access stratum message generated by the second core network entity.

Paragraph 72. Circuitry for a communications device, the circuitry comprising transmitter circuitry configured to transmit signals via a wireless access interface provided by an infrastructure equipment of a wireless communications network, the wireless communications network comprising first and second core network entities and the infrastructure equipment providing the wireless access interface for a cell, receiver circuitry configured to receive signals via the wireless access interface, and controller circuitry configured to control the transmitter circuitry and the receiver circuitry so that the communications device is operable: to register with the first core network entity, while registered with the first core network entity, to register with the second core network entity, to receive in the cell an access stratum message transmitted by the infrastructure equipment, the access stratum message comprising a first non-access stratum message generated by the first core network entity and a second non-access stratum message generated by the second core network entity.

Paragraph 73. A communications device, the communications device comprising a transmitter configured to transmit signals via a wireless access interface provided by an infrastructure equipment of a wireless communications network, the wireless communications network comprising first and second core network entities and the infrastructure equipment providing the wireless access interface for a cell, a receiver configured to receive signals via the wireless access interface, and a controller configured to control the transmitter and the receiver so that the communications device is operable: to register with the first core network entity, while registered with the first core network entity, to register with the second core network entity, to receive in the cell an access stratum message transmitted by the infrastructure equipment, the access stratum message comprising a non-access stratum message generated by one of the first core network entity and the second core network entity and an indication of which of the first core network entity and the second core network entity generated the non-access stratum message.

Paragraph 74. Circuitry for a communications device, the circuitry comprising transmitter circuitry configured to transmit signals via a wireless access interface provided by an infrastructure equipment of a wireless communications network, the wireless communications network comprising first and second core network entities and the infrastructure equipment providing the wireless access interface for a cell, receiver circuitry configured to receive signals via the wireless access interface, and controller circuitry configured to control the transmitter circuitry and the receiver circuitry so that the communications device is operable: to register with the first core network entity, while registered with the first core network entity, to register with the second core network entity, to receive in the cell an access stratum message transmitted by the infrastructure equipment, the access stratum message comprising a non-access stratum message generated by one of the first core network entity and the second core network entity and an indication of which of the first core network entity and the second core network entity generated the non-access stratum message.

Paragraph 75. Infrastructure equipment for use in a wireless communications network, the wireless communications network comprising first and second core network entities and the infrastructure equipment providing a wireless access interface for a cell, the infrastructure equipment comprising a transmitter configured to transmit signals to a communications device via the wireless access interface in the cell, a receiver configured to receive data from the communications device, and a controller configured to control the transmitter and the receiver so that the infrastructure equipment is operable: to receive from the first core network entity a first non-access stratum message for transmission to a communications device, to receive from the second core network entity a second non-access stratum message for transmission to the communications device, and to transmit in the cell to the communications device an access stratum message comprising the first non-access stratum message and the second non-access stratum message.

Paragraph 76. Circuitry for an infrastructure equipment for use in a wireless communications network, the wireless communications network comprising first and second core network entities and the infrastructure equipment providing a wireless access interface for a cell, the circuitry comprising transmitter circuitry configured to transmit signals to a communications device via the wireless access interface in the cell, receiver circuitry configured to receive data from the communications device, and controller circuitry configured to control the transmitter circuitry and the receiver circuitry so that the infrastructure equipment is operable: to receive from the first core network entity a first non-access stratum message for transmission to a communications device, to receive from the second core network entity a second non-access stratum message for transmission to the communications device, and to transmit in the cell to the communications device an access stratum message comprising the first non-access stratum message and the second non-access stratum message.

Paragraph 77. Infrastructure equipment for use in a wireless communications network, the wireless communications network comprising first and second core network entities and the infrastructure equipment providing a wireless access interface for a cell, the infrastructure equipment comprising a transmitter configured to transmit signals to a communications device via the wireless access interface in the cell, a receiver configured to receive data from the communications device, and a controller configured to control the transmitter and the receiver so that the infrastructure equipment is operable: to determine that the communications device is registered with the first core network entity and the second core network entity, to receive from the first core network entity a non-access stratum message for transmission to a communications device, to transmit in the cell to the communications device the access stratum message comprising the non-access stratum message and an indication that the first core network entity generated the non-access stratum message.

Paragraph 78. Circuitry for infrastructure equipment for use in a wireless communications network, the wireless communications network comprising first and second core network entities and the infrastructure equipment providing a wireless access interface for a cell, the circuitry comprising transmitter circuitry configured to transmit signals to a communications device via the wireless access interface in the cell, receiver circuitry configured to receive data from the communications device, and controller circuitry configured to control the transmitter circuitry and the receiver circuitry so that the infrastructure equipment is operable: to determine that the communications device is registered with the first core network entity and the second core network entity, to receive from the first core network entity a non-access stratum message for transmission to a communications device, to transmit in the cell to the communications device the access stratum message comprising the non-access stratum message and an indication that the first core network entity generated the non-access stratum message.

Paragraph 79. A communications device, the communications device comprising a transmitter configured to transmit signals via a wireless access interface provided by a first infrastructure equipment of a wireless communications network, the wireless communications network comprising the first infrastructure equipment providing the wireless access interface in a first cell, a second infrastructure equipment providing a wireless access interface in a second cell, and a core network part, a receiver configured to receive signals via the wireless access interface, and a controller configured to control the transmitter and the receiver so that the communications device is operable: to derive a first security key for transmitting data in the first cell based on a first subscriber identity associated with the communications device, to derive a second security key for transmitting data in the second cell, the second security key being derived based on the first security key, to perform a handover to the second cell, to receive a key change indication transmitted by the second infrastructure equipment, and in response to receiving the key change indication, to use a third key for transmitting data in the second cell, the third key based on a second subscriber identity associated with the communications device.

Paragraph 80. Circuitry for a communications device, the circuitry comprising transmitter circuitry configured to transmit signals via a wireless access interface provided by a first infrastructure equipment of a wireless communications network, the wireless communications network comprising the first infrastructure equipment providing the wireless access interface in a first cell, a second infrastructure equipment providing a wireless access interface in a second cell, and a core network part, receiver circuitry configured to receive signals via the wireless access interface, and controller circuitry configured to control the transmitter circuitry and the receiver circuitry so that the communications device is operable: to derive a first security key for transmitting data in the first cell based on a first subscriber identity associated with the communications device, to derive a second security key for transmitting data in the second cell, the second security key being derived based on the first security key, to perform a handover to the second cell, to receive a key change indication transmitted by the second infrastructure equipment, and in response to receiving the key change indication, to use a third key for transmitting data in the second cell, the third key based on a second subscriber identity associated with the communications device.

Paragraph 81. Infrastructure equipment for use in a wireless communications network, the wireless communications network comprising a first infrastructure equipment in a public network portion of the wireless communications network providing a wireless access interface in a first cell, the infrastructure equipment in a non-public network portion of the wireless communications network providing a wireless access interface in a second cell, and a core network part, the infrastructure equipment comprising a transmitter configured to transmit signals to a communications device via the wireless access interface in the second cell, a receiver configured to receive data from the communications device, and a controller configured to control the transmitter and the receiver so that the infrastructure equipment is operable: to receive a request from the first infrastructure equipment for a handover of a communications device from the first cell to the second cell, to receive an indication of a second security key for transmitting data to the communications device in the second cell after the handover, the indication transmitted by the first infrastructure equipment, the second security key derived based on a first subscriber identity associated with the communications device, to establish a connection with the communications device in the second cell, and to transmit a key change indication to the communications device, the key change indication requesting the communications device to use a third key for transmitting data in the second cell, the third key based on a second subscriber identity associated with the communications device.

Paragraph 82. Circuitry for infrastructure equipment for use in a wireless communications network, the wireless communications network comprising a first infrastructure equipment in a public network portion of the wireless communications network providing a wireless access interface in a first cell, the infrastructure equipment in a non-public network portion of the wireless communications network providing a wireless access interface in a second cell, and a core network part, the infrastructure equipment comprising transmitter circuitry configured to transmit signals to a communications device via the wireless access interface in the second cell, receiver circuitry configured to receive data from the communications device, and controller circuitry configured to control the transmitter circuitry and the receiver circuitry so that the infrastructure equipment is operable: to receive a request from the first infrastructure equipment for a handover of a communications device from the first cell to the second cell, to receive an indication of a second security key for transmitting data to the communications device in the second cell after the handover, the indication transmitted by the first infrastructure equipment, the second security key derived based on a first subscriber identity associated with the communications device, to establish a connection with the communications device in the second cell, and to transmit a key change indication to the communications device, the key change indication requesting the communications device to use a third key for transmitting data in the second cell, the third key based on a second subscriber identity associated with the communications device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 23.501 "System architecture for the 5G System (5G5)", Release 16
[4] RFC 4187 Extensible Authentication Protocol Method for 3rd Generation Authentication and Key Agreement (EAP-AKA)
[5] 3GPP TS 33.501
[6] 3GPP TS 38.300

The invention claimed is:

1. A method of requesting a handover of a communications device in a source cell by a source infrastructure equipment in a wireless communications network, the wireless communications network including the source infrastructure equipment and a non public network (NPN) portion including a target infrastructure equipment providing a wireless access interface in a target cell, and the source infrastructure equipment and the target infrastructure equipment being connected to a core network part, the method comprising:
   transmitting, by the source infrastructure equipment to the target infrastructure equipment, without involving the core network part, and via an interface connecting the source infrastructure equipment and the target infrastructure equipment, a handover request message requesting the handover of the communications device; and
   receiving, via the interface connecting the source infrastructure equipment and the target infrastructure equipment, a handover response message from the target equipment indicating that the handover may proceed,
   wherein the handover request includes an indication of one or more identities associated with non-public cells which the communications device is permitted to access,
   wherein the handover response message is received from the target infrastructure equipment after the target infrastructure equipment performs a permission determination based upon at least the indication of the one or more identities associated with the non-public cells which the communications device is permitted to access included in the handover request transmitted by the source infrastructure equipment to the target infrastructure equipment.

2. The method according to claim 1, wherein the one or more identities include one or more of:
   a non-public network identity,
   a closed access group identity,
   a slice identifier, and
   an access point name.

3. The method according to claim 1, wherein the wireless communications network includes a public network (PN) portion including the source infrastructure equipment providing a wireless access interface in the source cell.

4. The method according to claim 1, wherein
   access to the source cell is restricted to one or more closed access groups (CAGs), and
   the one or more identities include an indication of the one or more closed access groups associated with the source cell.

5. The method according to claim 1, the method comprising:
   receiving a list of closed access groups (CAGs) associated with the communications device, the CAGs corresponding to NPN cells which the communications device is permitted to access, wherein
   the indication of the one or more identities associated with the non-public cells which the communications device is permitted to access includes the list of CAGs.

6. The method according to claim 1, the method comprising:
   transmitting, via a wireless access interface of the source cell, a handover command to the communications device.

7. The method according to claim 1, the method comprising receiving, via the interface, an indication that the communications device is not permitted to access the target cell.

8. The method according to claim 1, wherein the handover request includes:
   a key for transmission and reception of access stratum data in the target cell, and
   an indication of a type of subscriber identity used to derive the key.

9. The method according to claim 8, wherein
   the type of subscriber identity is selected from a plurality of types of subscriber identity, and
   each of the plurality of types of subscriber identity is associated with a different format.

10. The method according to claim 8, wherein the type of subscriber identity is one of a public network (PN) subscriber identity and a NPN subscriber identity.

11. The method according to claim 1, wherein the core network part includes one or more access and mobility management function (AMF).

12. The method according to claim 11, wherein the AMF provides an endpoint for a non-access stratum control plane.

13. The method according to claim 1, wherein the interface connecting the source infrastructure equipment and the target infrastructure equipment is an inter-infrastructure equipment interface.

14. The method according to claim 13, wherein the interface connecting the source infrastructure equipment and the target infrastructure equipment is and X2 or Xn interface.

15. A method of requesting a handover of a communications device in a source cell by a source infrastructure equipment in a wireless communications network, the wireless communications network including the source infrastructure equipment and a non public network (NPN) portion including a target infrastructure equipment providing a wireless access interface in a target cell, the method comprising:
   transmitting, by the source infrastructure equipment to the target infrastructure equipment via an interface connecting the source infrastructure equipment and the target infrastructure equipment, a handover request message requesting the handover of the communications device,
   wherein the handover request includes:
      an indication of one or more identities associated with non-public cells which the communications device is permitted to access,
      a key for transmission and reception of access stratum data in the target cell, and
      an indication of a type of subscriber identity used to derive the key.

* * * * *